United States Patent
Kirigaya et al.

(10) Patent No.: US 7,615,909 B2
(45) Date of Patent: Nov. 10, 2009

(54) SURFACE ACOUSTIC WAVE MOTOR

(75) Inventors: Masahiro Kirigaya, Kyotanabe (JP); Masahiro Sato, Nara (JP); Youhei Ishigami, Shijonawate (JP); Kazuo Sawada, Katano (JP); Minoru Kurosawa, Yokohama (JP)

(73) Assignees: Panasonic Electric Works Co., Ltd, Osaka (JP); Tokyo Institute of Technology, Tokyo (JP)

( * ) Notice: Subject to any disclaimer, the term of this patent is extended or adjusted under 35 U.S.C. 154(b) by 208 days.

(21) Appl. No.: 11/910,047

(22) PCT Filed: Mar. 27, 2006

(86) PCT No.: PCT/JP2006/306077

§ 371 (c)(1),
(2), (4) Date: Sep. 28, 2007

(87) PCT Pub. No.: WO2006/104070

PCT Pub. Date: Oct. 5, 2006

(65) Prior Publication Data

US 2008/0252171 A1     Oct. 16, 2008

(30) Foreign Application Priority Data

Mar. 28, 2005 (JP) ............................. 2005-091019
Jul. 19, 2005 (JP) ............................. 2005-209150

(51) Int. Cl.
*H03H 9/25* (2006.01)

(52) U.S. Cl. .................. 310/313 R; 310/313 B; 310/313 D; 310/316.01; 310/316.02

(58) Field of Classification Search ............ 310/313 B, 310/313 D, 313 R, 316.01, 316.02
See application file for complete search history.

(56) References Cited

U.S. PATENT DOCUMENTS 5,006,749 A * 4/1991 White .................. 310/323.03

(Continued)

FOREIGN PATENT DOCUMENTS

JP          9-233865          9/1997

(Continued)

OTHER PUBLICATIONS

English Language Abstract of JP 11-146665.

(Continued)

*Primary Examiner*—Thomas M Dougherty
(74) *Attorney, Agent, or Firm*—Greenblum & Bernstein, P.L.C.

(57) ABSTRACT

In an energy recovery type surface acoustic wave motor, an increase in energy efficiency at the time of energy recovery and supply is achieved by adjusting phase change. A surface acoustic wave motor comprises: a surface acoustic wave substrate; a slider provided with an applied pressure; a driving interdigital electrode connected to an external power supply for generating a driving surface acoustic wave on a surface so as to drive the slider by a frictional force which is generated on a contact surface of the slider with the surface acoustic wave substrate based on the surface acoustic wave and the applied pressure; recovery interdigital electrodes placed forward and backward in the direction of travel of the surface acoustic wave for recovering energy of a surface acoustic wave unused to drive the slider, and for using that energy to generate a surface acoustic wave; and phase adjusting means for matching the phase of a surface acoustic wave generated by the recovery interdigital electrodes to the phase of the driving surface acoustic wave generated by the driving interdigital electrode.

18 Claims, 16 Drawing Sheets

U.S. PATENT DOCUMENTS

| | | | |
|---|---|---|---|
| 6,331,747 B2 * | 12/2001 | Yoshida et al. | 310/313 R |
| 6,516,665 B1 * | 2/2003 | Varadan et al. | 73/504.01 |
| 6,665,708 B1 * | 12/2003 | Tikekar et al. | 709/215 |
| 7,365,473 B2 * | 4/2008 | Vermeulen et al. | 310/313 R |
| 2001/0015591 A1 | 8/2001 | Yoshida et al. | |

FOREIGN PATENT DOCUMENTS

| | | |
|---|---|---|
| JP | 9-322573 | 12/1997 |
| JP | 11-146665 | 5/1999 |
| JP | 2001-238473 | 8/2001 |
| JP | 2001-359287 | 12/2001 |

OTHER PUBLICATIONS

English Language Abstract of JP 2001-359287.
English Language Abstract of JP 2001-238473.
English Language Abstract of JP 9-322573.
English Language Abstract of JP 9-233865.

* cited by examiner

[図30]

SURFACE ACOUSTIC WAVE MOTOR

TECHNICAL FIELD

The present invention relates to a surface acoustic wave motor, and more particularly to an energy recovery type surface acoustic wave motor.

BACKGROUND ART

In the prior art, ultrasonic motors are known as actuators. One of the ultrasonic motors is a motor using surface acoustic wave (SAW), namely a surface acoustic wave motor. The surface acoustic wave is, for example, a wave of oscillation (Rayleigh wave) which is based on an elliptic motion generated in the surface of an elastic body, and which propagates on the surface of the elastic body. The driving force of the motor is a frictional force which is output based on this elliptic motion. The surface acoustic wave motor is expected for use as a small size motor having excellent operational characteristics of high speed, high response and high thrust. For example, a moving speed of 1 m/sec has been achieved as its characteristics. Further, a demonstration has been made that it can produce a thrust equal to or greater than its self-gravity.

For example, a surface acoustic wave motor is comprised of: a surface acoustic wave substrate as a stator; interdigital electrodes (IDT: Interdigital Transducer) for generating a surface acoustic wave on its surface; a slider placed on the surface acoustic wave substrate for movement; pressure applying means for contacting the slider to the surface acoustic wave substrate at a predetermined pressure to obtain a frictional force (refer to e.g. Japanese Laid-open Patent Publication Hei 09-233865).

Further, an energy recovery type surface acoustic wave motor is known, in which in order to generate a surface acoustic wave in a surface acoustic wave motor, interdigital electrodes provided at an end of a surface acoustic wave substrate are used to supply energy, while the energy of the surface acoustic wave unused for driving is recovered at the other end for reuse (refer to e.g. Japanese Laid-open Patent Publication Hei 11-146665).

Referring to FIGS. 25A and 25B, a conventional energy recovery type surface acoustic wave motor will be described. This surface acoustic wave motor is a linear motor comprising a surface acoustic wave substrate 2 as a stator, and a slider 3 driven on the surface S for linear movement. On the surface S of the surface acoustic wave substrate 2 are provided an energy-complementary interdigital electrode 4 composed of interdigital electrodes 4a and 4b, and a pair of interdigital electrodes 5 placed distant from each other and sandwiching the interdigital electrode 4 therebetween.

The surface acoustic wave substrate 2 is formed of a piezoelectric material having a thickness of about 1 mm. The interdigital electrodes 4 and 5 are formed by patterning a thin film conductor into a shape of comb teeth meshing with each other. The interdigital electrodes 5 recover energy of the surface acoustic wave, and at the same time supply energy to generate a surface acoustic wave. The slider 3 is placed in a moving section 21 provided between the interdigital electrode 4 and the interdigital electrode 5. The slider 3 is being pressed onto the surface S by applied pressure N from pressure applying means 30.

In the above-mentioned state, when a high frequency (MHz range) voltage of a predetermined frequency $\omega$ is applied to the interdigital electrode 4b from an external power supply V1 with $v1=v0 \cdot \cos \omega t$, and to the interdigital electrode 4a from an external power supply V2 with $v2=v0 \sin \omega t$, then the interdigital electrodes 4a and 4b convert the electrical energy to mechanical energy of wave, thereby generating a surface acoustic wave W which travels on the surface S rightward in the drawing. Note that the moving direction of a point on the surface S based on the elliptic motion of the surface acoustic wave W is opposite to the direction of travel of the surface acoustic wave W. Frictional force caused by the elliptic motion of the surface acoustic wave W traveling rightward operates the slider 3 so that the slider 3 is driven in a direction (leftward in the drawing) opposite to the direction of travel of the surface acoustic wave W. The surface acoustic wave W passes to the right side of the slider 3 while losing energy to drive the slider 3, and becomes a surface acoustic wave w which further travels rightward.

The interdigital electrode 5 on the right receives and converts mechanical energy from the surface acoustic wave w to electrical energy, performing so-called mechanical to electrical conversion. The energy recovered as electrical energy is sent to the interdigital electrode 5 on the left which is electrically connected via wiring 7. The interdigital electrode 5 on the left performs electromechanical conversion to convert the electrical energy to mechanical energy so as to supply energy to the surface S, contributing to the generation of surface acoustic wave W. This surface acoustic wave motor uses the pair of interdigital electrodes 5 to circulate energy (recover and supply energy), and uses the interdigital electrode 4 to complement the consumption of energy, so as to operate using less energy than not using the interdigital electrodes 5.

However, the energy recovery type surface acoustic wave motors disclosed in the above-mentioned FIGS. 25A and 25B and Japanese Laid-open Patent Publication Hei 11-146665 have problems as described below. This will be described with reference to FIG. 26 and FIG. 27A to FIG. 30B. FIG. 26 shows an enlarged view of a portion where the slider 3 contacts the surface S, in which amplitudes of surface acoustic waves W, w1 and w2 generated on the surface S are shown enlarged. At the portion where the slider 3 contacts the surface S of the surface acoustic wave substrate 2, a surface acoustic wave w2 with a change in phase from the original surface acoustic wave W by a phase difference $\Delta X$ is generated.

Thus, the surface acoustic wave w having passed the slider 3 contains both the surface acoustic wave w2 with a change in phase and a surface acoustic wave w1 which is in phase with the surface acoustic wave W. For this reason, the surface acoustic wave w having arrived at the interdigital electrode 5 on the right varies in phase along a width direction perpendicular to the direction of travel thereof, so that when the interdigital electrode 5 converts mechanical energy to electrical energy, the waves partially eliminate each other, causing an energy loss. The reason why the surface acoustic wave w is generated on the surface S in a mixed state of the surface acoustic waves w1 and w2 is because the slider has a width f smaller than a width g of the surface acoustic wave formed by the interdigital electrodes 4 and 5 as shown in FIG. 25A.

The generation of the energy loss due to the presence of the above-mentioned surface acoustic wave w2 is further described. First, energy recovery efficiency will be described. When the surface acoustic waves w1 and w2 have no phase difference, energies $e1=e(w1)$ and $e2=e(w2)$ of the respective waves w1 and w2, and energy $e=e(w)$ of wave recovered from the total wave w are expressed by FIGS. 27A and 27B. Here, $e(x)$ represents an operation to calculate energy of wave. Similarly, when the surface acoustic waves w1 and w2 have a phase difference, energies e1 and e2 of the respective waves w1 and w2, and energy $e\alpha=e(w)$ of wave recovered from the total wave w are expressed by FIGS. 28A and 28B.

If the surface acoustic wave w contains a phase difference as in the latter, a phase difference $\Delta t1$ is generated between the energies e1 and e2 corresponding to the phase difference $\Delta X$ in FIG. 26. Due to the influence of this phase difference $\Delta t1$, the energy ea is lower than the energy e(e$\alpha$<e), causing a lower energy recovery efficiency. Furthermore, a phase difference $\Delta t2$ is generated in the energy ea, although the phase of the energy e is in phase with the phase of the complementary energy supplied from the interdigital electrode 4.

Next, energy supply efficiency will be described. If a complementary energy E0 supplied from the interdigital electrode 4 is in phase with the circulating energy e supplied from the interdigital electrode 5 on the left, these energies E0 and e, and energy E1=e(W(E0+e)) of a wave W generated by these energies are expressed by FIGS. 29A and 29B. Here, W(x) represents an operation to generate a wave. Similarly, when there is a phase difference $\Delta t2$ as described above, then a complementary energy E0, a circulating energy e$\alpha$ supplied with the phase difference $\Delta t2$, and energy E$\beta$=e(W(E0+e$\alpha$)) of a wave W generated by the supply of these energies E0 and e$\alpha$ are expressed by FIGS. 30A and 30B.

If the complementary energy E0 is in phase with the circulating energy e, they do not badly influence each other. However, if not in phase, the energy E$\beta$ is lower than the energy E1(E$\alpha$<E1) (sic, correctly: E$\beta$<E1), causing a lower energy supply efficiency. Furthermore, it occurs that the phase of the energy E$\beta$ has a phase difference $\Delta t3$ to the energy E1.

As described above, due to the phase difference $\Delta X$ generated by the contact of the slider 3 to the surface S of the surface acoustic wave substrate 2, it occurs that the circulating energy ea and the energy E$\beta$ of the generated surface acoustic wave W are reduced, and the presence of the phase differences $\Delta t1$, $\Delta t2$ and $\Delta t3$ causes energy loss and degradation in driving characteristics. Further, these phase differences are caused not only by the contact of the slider 3 to the surface S, but also by e.g. ambient temperature change which causes a change in the characteristics of the surface acoustic wave substrate 2, and a deviation of an interdigital electrode pattern provided on the surface S from a design value as well. Thus, a conventional surface acoustic wave motor still has a limitation in the reduction in the power to drive the slider 3.

The present invention is to solve the above-described problems, and its object is to provide an energy recovery type surface acoustic wave motor which adjusts the phase change at the time of energy recovery and supply so as to achieve an increase in the energy efficiency.

DISCLOSURE OF THE INVENTION

In order to achieve the above-described object, the surface acoustic wave motor according to the present invention comprises: a surface acoustic wave substrate; a slider placed to contact a surface of the surface acoustic wave substrate while being provided with an applied pressure; a driving interdigital electrode(s) provided on the surface of the surface acoustic wave substrate and connected to an external power supply for generating a driving surface acoustic wave in the surface acoustic wave substrate so as to drive the slider by a frictional force which is generated on a contact surface of the slider with the surface acoustic wave substrate based on the surface acoustic wave and the applied pressure to the slider; and recovery interdigital electrodes placed on the surface of the surface acoustic wave substrate forward and backward in the direction of travel of the surface acoustic wave for recovering energy of a surface acoustic wave, unused to drive the slider, in the surface acoustic wave, and for using the recovered energy to generate a surface acoustic wave, wherein the surface acoustic wave motor further comprises phase adjusting means for matching the phase of the surface acoustic wave generated by the recovery interdigital electrode to the phase of the driving surface acoustic wave generated by the driving interdigital electrode.

This arrangement comprises phase adjusting means for matching the phase of the surface acoustic wave generated by the recovery interdigital electrode to the phase of the driving surface acoustic wave generated by the driving interdigital electrode, so that the surface acoustic wave motor can be driven with a high energy efficiency based on the driving surface acoustic wave aligned in phase. The phase adjustment by the phase adjusting means according to the present invention can be made at any stage, such as a stage before recovering the energy of the surface acoustic wave by the recovery interdigital electrode, or during the circulation of the recovered energy, or a stage of generating a surface acoustic wave by providing the recovery interdigital electrode with energy, or the like.

When the phase adjustment is made before the recovery, the energy of the surface acoustic wave can be efficiently recovered. Further, when the adjustments are made after the recovery and at the supply stage, it is possible to generate a driving surface acoustic wave with a high energy efficiency, i.e. a driving surface acoustic wave effectively used for the slider. Thus, the energy recovery type surface acoustic wave motor of the present invention can adjust a phase change at the time of energy recovery and supply by using the phase adjusting means so as to align the phase of the surface acoustic wave. Accordingly, it is possible to avoid interference between surface acoustic waves of different phases which makes the energy ineffective, achieving an increase in the energy efficiency.

The surface acoustic wave motor of the present invention according to the improved invention mentioned above has at least a pair of the recovery interdigital electrodes, one of which is used to convert mechanical energy of the surface acoustic wave to, and recover, electrical energy, and the other of which is used to convert the recovered electrical energy to mechanical energy for generating a driving surface acoustic wave.

This arrangement recovers and circulates energy in the form of electrical energy, so that the phase adjustment can be made by an electrical circuit, facilitating the phase adjustment by the phase adjusting means.

In the surface acoustic wave motor of the present invention according to the improved invention mentioned above, the phase adjusting means is formed of an electrical circuit connected between the one and the other of the recovery interdigital electrodes.

This arrangement makes the phase adjustment in the form of electrical energy by using the electrical circuit, so that it is easy to make phase adjustments as desired, and also easy to adapt to size changes of the slider and adapt to a fine adjustment to a mechanical adjustment.

In the surface acoustic wave motor of the present invention according to the improved invention mentioned above, the phase adjusting means is set based on a length of a region of the surface acoustic wave substrate between ones of the respective recovery and driving interdigital electrodes in which region the slider moves, wherein the length is set at a sum length of a length to generate a resonant-state surface acoustic wave without placing the slider in the region plus a length corresponding to an amount of phase change caused in the resonant-state surface acoustic wave by placement of the slider in the region.

According to this arrangement, the phase adjusting means is formed by preliminarily adding, to the length of the moving section, a distance corresponding to an amount of phase change caused in the surface acoustic wave by the placement of the slider. Thus, an increase in the energy efficiency can be easily achieved by designing a pattern of the interdigital electrodes placed on the surface of the surface acoustic wave substrate. Here, the generation of a resonant-state surface acoustic wave is equivalent to the generation of a surface acoustic wave with the periodic boundary conditions satisfied by the boundary between the generation side and the recovery side of the surface acoustic wave.

The surface acoustic wave motor of the present invention according to the improved invention mentioned above has at least a pair of the recovery interdigital electrodes, one of which is used to reflect and bring the surface acoustic wave back to the driving interdigital electrode so as to recover the energy of the surface acoustic wave, and the other of which is used to reflect the brought back surface acoustic wave again so as to generate a driving surface acoustic wave.

This arrangement makes it possible to form, in the surface acoustic wave substrate, means for recovering and supplying the energy of a surface acoustic wave. This allows the use of the surface of the surface acoustic wave substrate to mechanically recover and circulate energy, so that it is not necessary to use an electrical circuit for circulation. The phase adjustment by the phase adjusting means can be made e.g. by connecting a passive element for impedance change to the recovery interdigital electrode. In the surface acoustic wave motor of the present invention, waves which are in multi-reflected waves and which are directed in the same direction as the driving surface acoustic wave are aligned in phase with each other so as to allow the energy of these waves to be higher than the energy of waves directed in the opposite direction, and thereby drive the slider. Thus, the moving speed of the slider can be changed by adjusting the reflectivity.

In the surface acoustic wave motor of the present invention according to the improved invention mentioned above, the recovery interdigital electrode used as an interdigital electrode for driving serves in common as the driving interdigital electrode.

This arrangement makes it possible to simplify the structure of the interdigital electrodes, and reduce the size of the surface acoustic wave motor.

In the surface acoustic wave motor of the present invention according to the improved invention mentioned above, the phase adjusting means is set based on a length between equivalent reflecting surfaces of the pair of recovery interdigital electrodes, in which the length is essentially equal to an integer multiple of a half wavelength of the surface acoustic wave generated by the recovery interdigital electrode.

This arrangement makes it possible to automatically make the phase adjustment when a surface acoustic wave is reflected twice to become a driving surface acoustic wave again. Further, the distance between the recovery interdigital electrodes is set using the length between the equivalent reflecting surfaces, in which the interdigital electrodes are formed by multiple comb teeth-shaped element electrodes, thereby making it possible to achieve setting of optimum conditions for the entire interdigital electrodes.

In the surface acoustic wave motor of the present invention according to the improved invention mentioned above, the phase adjusting means is formed of an electrical circuit connected to the recovery interdigital electrode placed forward in the direction of travel of the driving surface acoustic wave, in which an impedance of the electrical circuit is set so as to adjust the phase of a reflected wave reflected by that interdigital electrode.

This arrangement facilitates the phase adjustment.

In the surface acoustic wave motor of the present invention according to the improved invention mentioned above, the reflectivity of the reflected wave reflected by the recovery interdigital electrode is adjusted by at least one of: an adjustment of distance between element electrodes of that interdigital electrode; an adjustment of number of element electrodes of that interdigital electrode; and an adjustment of magnitude of the applied pressure provided to the slider.

This arrangement makes it possible to easily control the movement of the slider by adjusting the reflectivity. The distance between the element electrodes and the number of element electrodes can be formed in the surface acoustic wave substrate based on a design. Further, the adjustment of the reflectivity based on the adjustment of applied pressure can be made as desired when driving the surface acoustic wave motor.

In the surface acoustic wave motor of the present invention according to the improved invention mentioned above, the recovery interdigital electrode has connected thereto an electrical circuit to set impedance so as to adjust the reflectivity of a reflected wave reflected by that interdigital electrode.

This arrangement makes it possible to easily adjust the reflectivity as desired while or before driving the surface acoustic wave motor.

In the surface acoustic wave motor of the present invention according to the improved invention mentioned above, the driving interdigital electrodes are provided on the surface of the surface acoustic wave substrate forward and backward in the direction of travel of the driving surface acoustic wave, in which the surface acoustic wave motor comprises a switch for selectively connecting the external power supply to either of these driving interdigital electrodes, and a switch for connecting the electrical circuit to either of the pair of recovery interdigital electrodes, such that the direction of travel of the driving surface acoustic wave is switched by these switches.

This arrangement makes it possible to reduce the number of external power supplies for generating a driving surface acoustic wave to one.

In the surface acoustic wave motor of the present invention according to the improved invention mentioned above, the driving interdigital electrodes are placed between the pair of recovery interdigital electrodes, and are all connected to the external power supply without via the switches, such that the electrical circuit is selectively connected to either of the pair of recovery interdigital electrodes by using the switches so as to switch the direction of travel of the driving surface acoustic wave.

This arrangement does not switch the external power supply, so that a single switch can switch the moving direction of the slider for reciprocal movement.

In the surface acoustic wave motor of the present invention according to the improved invention mentioned above, the electrical circuit is variable in impedance.

This arrangement makes it possible to control the moving speed and the moving direction of the slider in real time. When driving the surface acoustic wave motor, it is possible to adjust the reflectivity and operate the slider in response to variations in conditions caused, for example, by: variations in the wave amplitude due to e.g. variations in the voltage of the external power supply; variations in the wavelength and occurrence of a phase difference due to variations in the characteristics of the surface acoustic wave substrate and due to manufacturing variations in the size of the interdigital electrode; and variations in the phase due to e.g. variations in the applied pressure of the slider.

The surface acoustic wave motor of the present invention according to the improved invention mentioned above further comprises: a speed detecting device for detecting a relative speed of the slider relative to the surface acoustic wave substrate; a speed input device for inputting a target moving speed of the slider; and a feedback device for feedback control which changes the impedance of the electrical circuit so as to allow the relative speed detected by the speed detecting device to be equal to the target moving speed input by the speed input device.

This arrangement makes it possible to easily control the speed of the slider by changing the impedance, such as resistance component, of the electrical circuit without adjusting the external power supply.

The surface acoustic wave motor of the present invention according to the improved invention mentioned above further comprises: a phase difference detecting device for detecting a phase difference between a phase of a voltage waveform from the external power supply for generation of a surface acoustic wave and a phase of a driving surface acoustic wave actually generated; a phase difference input device for inputting a target phase difference; and a feedback device for feedback control which changes the impedance of the electrical circuit so as to allow the phase difference detected by the phase difference detecting device to be equal to the target phase difference input by the phase difference input device.

This arrangement makes it possible to easily control the speed of the slider by adjusting the impedance, such as reactance component, of the electrical circuit so as to adjust the phase of the surface acoustic wave without adjusting the external power supply.

In the surface acoustic wave motor of the present invention according to the improved invention mentioned above, the driving interdigital electrodes are provided on the surface of the surface acoustic wave substrate forward and backward in the direction of travel of the surface acoustic wave, wherein at least one of the driving interdigital electrodes is provided with unidirectionalizing means for allowing amplitude of a surface acoustic wave emitted from one side to be larger than amplitude of a surface acoustic wave emitted from the other side without allowing the surface acoustic waves generated by that driving interdigital electrode to be emitted equally from both sides of the interdigital electrode.

This arrangement comprises the unidirectionalizing means to allow that energy, which has conventionally been treated as a loss, can be used for driving, thereby increasing the energy efficiency. More specifically, among surface acoustic waves generated on both sides of an interdigital electrode, normally those which are not directed to drive the slider are thrown away, causing energy loss. However, the provision of the unidirectionalizing means makes it possible to avoid the loss.

In the surface acoustic wave motor of the present invention according to the improved invention mentioned above, a width of a portion of the slider to contact the surface of the surface acoustic wave substrate, which width is perpendicular to the direction of travel of the surface acoustic wave, is effectively the same as an overlap width of element electrodes of the driving interdigital electrode(s).

This arrangement allows the width of a surface acoustic wave generated by the interdigital electrode to be substantially the same as the width of the contact portion of the slider with the surface acoustic wave substrate, so as to allow the surface acoustic waves arriving at the recovery interdigital electrode to be surface acoustic waves in the same phase. This makes it possible to recover energy with high utilization efficiency from the surface acoustic waves. More specifically, the phase adjusting means is formed based on the relationship in size between the slider and the interdigital electrodes. The phase change of the surface acoustic wave is adjusted by such phase adjusting means, so that energy, which has conventionally been treated as a loss, can be recovered, and that the phase of the circulated energy can be made the same as the phase of the supplied energy, making it possible to reduce the energy loss due to the interference when generating the surface acoustic wave, and thereby increase the energy efficiency.

In the surface acoustic wave motor of the present invention according to the improved invention mentioned above, the slider has, on the portion thereof to contact the surface of the surface acoustic wave substrate, contact projections which are uniformly distributed in a direction perpendicular to the direction of travel of the surface acoustic wave.

This arrangement allows the contact portion of the slider with the surface of the surface acoustic wave substrate to be uniform over the entire width thereof in a width direction perpendicular to the direction of travel of the surface acoustic wave. Thus, phase changes occurring in the width direction of the slider are substantially the same, making it possible to allow the surface acoustic wave to arrive at the recovery interdigital electrode with a uniform phase, and thereby efficiently recover the energy.

BRIEF DESCRIPTION OF DRAWINGS

FIG. 3A is a plan view of a surface acoustic wave motor according to a second embodiment of the present invention, while

FIG. 4A is a cross-sectional view of a contact portion, and an enlarged portion thereof, of a slider with a surface acoustic wave substrate in the surface acoustic wave motor, while

FIG. 5A is a schematic explanatory view of a surface acoustic wave motor according to a third embodiment of the present invention, while

FIG. 6B is a graph of the frequency characteristics of the reflectivity when the number of pairs in the interdigital electrode is changed, while

FIG. 7A is a schematic explanatory view of a surface acoustic wave motor according to a fourth embodiment of the present invention, while

FIG. 8A is a schematic explanatory view of a surface acoustic wave motor according to a fifth embodiment of the present invention, while

FIG. 9A is a graph of the frequency characteristics of a unidirectional interdigital electrode of the surface acoustic wave motor which are shown separately for the contributions of two interdigital electrodes, while

FIG. 12A is a partial top plan view showing still another example of an interdigital electrode of the surface acoustic wave motor, while

FIG. 25A is a plan view of a conventional surface acoustic wave motor, while

FIG. 27A is a graph showing the time variation of energies of two surface acoustic waves which are in the same phase, while

FIG. 28A is a graph showing the time variation of energies of two surface acoustic waves which have a phase difference, while

FIG. 29A is a graph showing the time variation of energies for surface acoustic wave generation, which are supplied from two energy sources in phase, while FIG. 30A is a graph showing the time variation of energies of two surface acoustic waves which have a phase difference, while

BEST MODE FOR CARRYING OUT THE INVENTION

Figure 1:
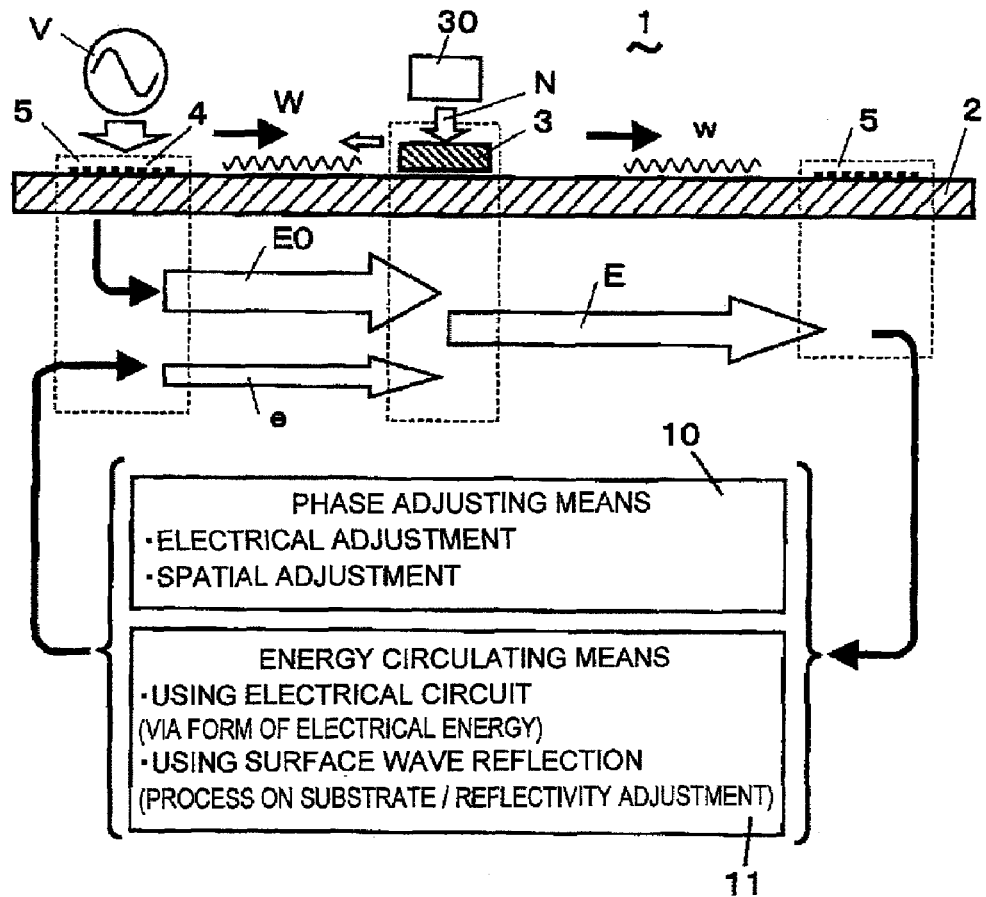
FIG. 1 is a conceptual view showing a structure of a surface acoustic wave motor of the present invention.

Hereinafter, an energy recovery type surface acoustic wave motor of the present invention will be described with reference to the drawings. FIG. 1 shows a conceptual structure of a surface acoustic wave motor 1. The surface acoustic wave motor 1 comprises: a surface acoustic wave substrate 2; a slider 3 placed to contact a surface S of the surface acoustic wave substrate 2 while being provided with an applied pressure N; a driving interdigital electrode 4 provided on the surface S and connected to an external power supply V for generating a driving surface acoustic wave W in the surface S so as to drive the slider 3 by a frictional force which is generated on a contact surface of the slider 3 with the surface acoustic wave substrate 2 based on the surface acoustic wave W and the applied pressure N to the slider 3; and recovery interdigital electrodes 5 placed on the surface S forward and backward in the direction of travel of the surface acoustic wave W for recovering the energy of a surface acoustic wave w, unused to drive the slider 3, in the surface acoustic wave W, and for using the recovered energy to generate a surface acoustic wave W.

Further, the surface acoustic wave motor 1 comprises: phase adjusting means 10 for matching the phase of the surface acoustic wave generated by the recovery interdigital electrode 5 to the phase of the driving surface acoustic wave W generated by the driving interdigital electrode 4; and energy circulating means 11 for circulating the recovered energy to the supply side. The surface acoustic wave substrate 2 is a stator of the surface acoustic wave motor 1, while the slider 3 is a mover. Both move relatively. As a matter of course, the roles of these stator and mover can be reversed. The respective constituent elements of the surface acoustic wave motor 1 will be described below.

The surface acoustic wave substrate 2 is formed using a piezoelectric material having a high electromechanical coupling coefficient. For example, a single crystal plate of lithium niobate (LiNbO$_3$) is used as the piezoelectric material. The surface acoustic wave substrate 2 is not limited to one which is entirely formed of a piezoelectric material, but can be one which is made by forming a piezoelectric thin film of e.g. ZnO or PZT on the surface of a non-piezoelectric material substrate. Of course, it can be a piezoelectric material of another shape or material. The surface acoustic wave substrate 2 has e.g. a rectangular shape of a thickness of about 1 mm. The outer shape can be not only a flat plate, but also a curved surface. Further, it can be not only rectangular, but also circular or an arbitrary shape.

The slider 3 is normally formed of a hard material such as silicon. The slider 3 has multiple projections formed on a contact surface thereof with the surface acoustic wave substrate 2 (refer to FIG. 4A and FIG. 5C). Such projections can be easily formed by an etching process e.g. in the case of using silicon. The material can be not only silicon, but can be a material with sufficient mechanical strength and abrasion resistance. The structure of the contact surface of the slider 3 is not limited to the one having projections if sufficient frictional force is generated between the contact surface of the slider 3 and the surface S of the surface acoustic wave substrate 2 in an elliptic motion due to the surface acoustic wave.

The pressure applying means 30 for providing the slider 3 with an applied pressure N is formed, for example, using a resilient body such as a plate spring, a spring coil or the like. The applied pressure can also be provided by using magnetic force of a permanent magnet or an electromagnet, such as by forming the slider 3 using a magnetic material, or providing the slider 3 with a solenoid coil.

Figure 10:
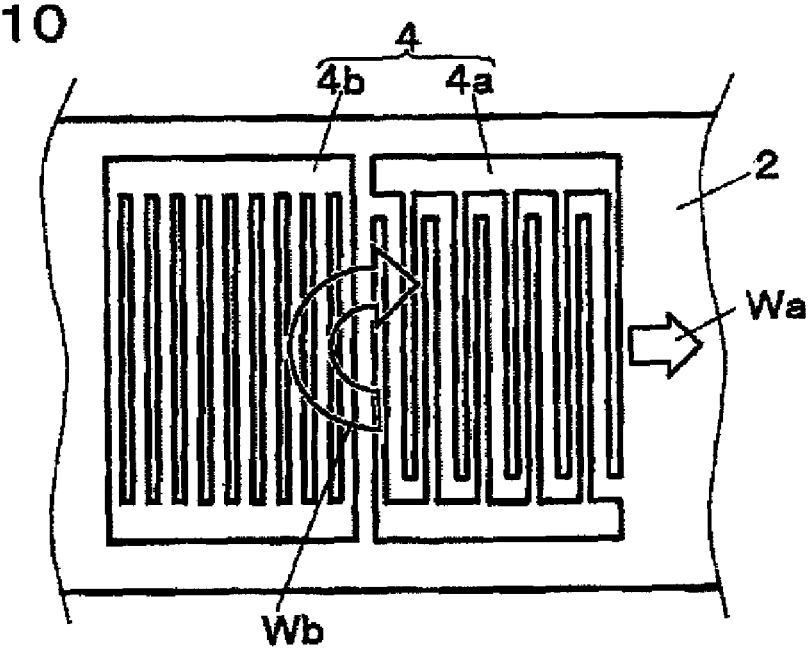
FIG. 10 is a partial top plan view showing an interdigital electrode of a surface acoustic wave motor according to a sixth embodiment of the present invention.

The driving interdigital electrode 4 and recovery interdigital electrodes 5 are basically formed of similarly structured interdigital electrodes (IDTs: Interdigital Transducers), although they are respectively different according to their use such as in presence or absence of power supply connection, placement position on the surface acoustic wave substrate 2, the number of element electrodes, and the like. Note that a ladder-shaped electrode may be used as a reflective electrode (FIG. 10). An interdigital electrode is formed such that comb teeth-shaped element electrodes are combined into a comb-shaped electrode, and two comb-shaped electrodes are combined with their comb teeth facing each other to mesh with each other (refer to FIG. 2).

The interdigital electrode is formed by patterning a thin film conductor formed on the surface S of the surface acoustic wave substrate 2. Normally, adjacent element electrodes are set to be opposite in polarity to each other. Note that element electrodes at a floating potential may be used as a reflective electrode. Further, the placement distance (pitch) between the element electrodes is normally set to be a half wavelength of the surface acoustic wave. The direction of travel of the surface acoustic wave generated by the interdigital electrode is in a direction perpendicular to the element electrodes. Similarly, the element electrodes of the interdigital electrode for absorbing the energy of the surface acoustic wave are in a direction perpendicular to the direction of travel of the surface acoustic wave. Note that although for convenience of description in the present specification, the left or right of the surface acoustic wave motor 1 may be referred to by leftward or rightward in the drawings, the surface acoustic wave motor 1 of the present invention can be driven in a posture in an arbitrary direction including left/right and up/down.

There are provided two recovery interdigital electrodes 5, which are for recovering energy and for supplying the recovered energy. Now, for convenience of description, the surface acoustic wave motor 1 shown in FIG. 1 assumes a situation where the driving surface acoustic wave W directed rightward in the drawing causes the slider 3 to move leftward. In this drawing, the recovery interdigital electrode 5 on the right is for recovery, while the recovery interdigital electrode 5 on the left is for supply. The recovery interdigital electrode 5 for energy supply can be formed in common with the driving interdigital electrode 4. Further, the slider 3 can be moved rightward if the driving interdigital electrode 4 is provided on the right, and the recovery interdigital electrode 5 on the left is used for recovery, while the recovery interdigital electrode 5 on the right is used for supply.

Normally, the above-mentioned driving interdigital electrode 4 and the recovery interdigital electrodes 5 are formed such that a surface acoustic wave emitted from these electrodes is directed to one direction, or formed such that the directivity can be controlled in use. In the former, the interdigital electrode is provided with a reflective electrode and/or a reflector, while in the latter, an additional power supply and an interdigital electrode are provided so as to be able to actively set the directivity. Note here that the "surface acoustic wave is directed to one direction" means that "the amplitude of the surface acoustic wave emitted from one side is larger than the amplitude of the surface acoustic wave emitted from the other side without allowing the surface acoustic wave to be emitted equally from both sides of the interdigital electrode". In FIG. 1, the driving interdigital electrode 4 and the recovery interdigital electrode 5 on the left serve as a unidirectional interdigital electrode for a surface acoustic wave to be emitted only rightward, while the recovery interdigital electrode 5 on the right serves as a unidirectional interdigital electrode for preventing a surface acoustic wave from being emitted rightward.

Next, the operation of the surface acoustic wave motor 1 will be described. In the above-mentioned state of FIG. 1, when a high frequency voltage in a predetermined MHz range is applied to the driving interdigital electrode 4 from an external power supply V, it generates, based on an electrical energy E0 of the high frequency voltage, a surface acoustic wave W which travels rightward on the surface S. When the surface acoustic wave W is excited, the slider 3 is driven leftward. The surface acoustic wave W, whose part of energy has been consumed to drive the slider 3, becomes a surface acoustic wave w which travels rightward from the slider 3. With all other conditions being constant, the moving speed of the slider 3 is determined by the magnitude of the applied voltage, while the moving distance is determined by the magnitude of the applied voltage and the time of voltage application.

The recovery interdigital electrode 5 on the right recovers energy from a mechanical energy E of the surface acoustic wave w. The recovered energy is circulated by the circulating means 11 back to the recovery interdigital electrode 5 on the left. The recovery interdigital electrode 5 on the left is provided with the circulated energy, and generates a driving surface acoustic wave W based on the energy e.

For the circulation, there are a case in which the recovered energy is in the form of electrical energy, and a case in which it is in the form of mechanical energy. In the case of electrical energy, the energy circulating means 11 circulates it by using an electrical circuit, while in the case of mechanical energy, it circulates it in the form of surface acoustic wave on the surface of the surface acoustic wave substrate 2, namely as a reflected wave.

The above-mentioned surface acoustic wave W is based on the energy E0 from the driving interdigital electrode 4 and the energy e from the recovery interdigital electrode 5. Surface acoustic waves based on these energies are matched in phase with each other by the phase adjusting means 10. The phase adjustment by the phase adjusting means 10 can be made at any stage, such as a stage before recovering the energy of the surface acoustic wave w by the recovery interdigital electrode 5, or during the circulation of the recovered energy, or a stage of generating a surface acoustic wave W by providing the recovery interdigital electrode 5 with energy, or the like.

First, the case of adjusting the phase by the phase adjusting means 10 at a stage before recovering the energy will be described. This is to set in advance the position of the recovery interdigital electrode 5 at a position which is spaced from the driving interdigital electrode 4 by a predetermined distance for enabling the phase adjustment, so as to allow it to receive the surface acoustic wave w having been adjusted in phase. Such a phase adjustment process can be called a spatial adjustment process. It is also possible to electrically adjust the impedance of the recovery interdigital electrode 5 so as to adjust an effective position of the recovery interdigital electrode 5. This is an electrical adjustment process. Further, the spatial placement relationship between the propagation region of the surface acoustic wave w and the slider 3 may be adjusted so that the surface acoustic wave w itself received by the recovery interdigital electrode 5 can be received with the wave fronts thereof being aligned without a phase difference. In this case, the energy of the surface acoustic wave can be efficiently recovered.

Next, the case of making a phase adjustment by the phase adjusting means 10 after the recovery or at the stage of supply will be described. In the case of circulating energy in an electrical form, it is easy to make a phase adjustment using an electrical circuit. For example, a series or a parallel connection of a passive element such as a resistor, a capacitor, an inductor, or the like can be used for the electrical circuit for phase adjustment. On the other hand, in the case of mechanically recovering energy in the form of surface acoustic wave using wave reflection, it is possible to make a phase adjustment by adjusting an effective reflection position in the interdigital electrode. The effective reflection position adjustment can be made by setting a spatial placement position of the recovery interdigital electrode 5, or by electrical adjustment to connect a passive element to the recovery interdigital electrode 5 for impedance change.

As mentioned above, the energy recovery type surface acoustic wave motor 1 of the present invention uses the phase adjusting means 10 at the time of energy recovery and supply to make a spatial or an electrical phase adjustment so as to make it possible to adjust a phase change of energy between before and after the recovery, and thereby match the phases of the surface acoustic waves with each other, achieving an increase in the energy efficiency. For example, it is possible to avoid interference between surface acoustic waves of different phases which makes the energy ineffective. Further, it is possible to generate a driving surface acoustic wave with a high energy efficiency, that is, a driving surface acoustic wave W effectively used for the slider 3. Hereinafter, the surface acoustic wave motor 1 will be specifically described by way of embodiments.

First Embodiment

Figure 2:
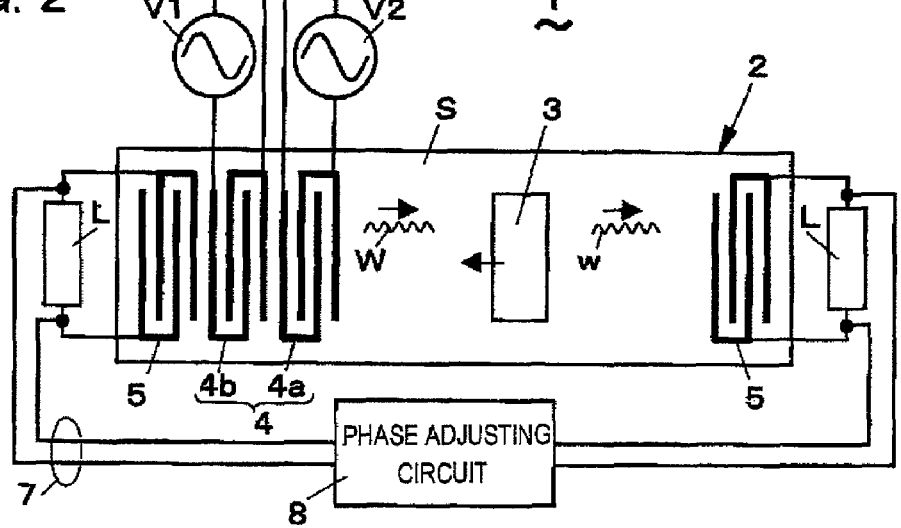
FIG. 2 is a plan view of a surface acoustic wave motor according to a first embodiment of the present invention.

FIG. 2 shows a surface acoustic wave motor 1 of a first embodiment. The surface acoustic wave motor 1 comprises: a surface acoustic wave substrate 2; recovery interdigital electrodes 5 placed on its surface S forward and backward in the direction of travel of a surface acoustic wave (rightward and leftward in the drawing) to make an electromechanical conversion between electrical energy and mechanical energy for recovering and supplying energy; a driving interdigital electrode 4 placed between the two recovery interdigital electrodes 5 and connected to external power supplies V1 and V2 for complementing energy; a slider 3 placed to contact the surface S of the surface acoustic wave substrate 2 while being provided with an applied pressure N by pressure applying means 30; wiring 7 for connecting the two recovery interdigital electrodes 5; and a phase adjusting circuit 8 inserted in the wiring 7.

Figure 25A:
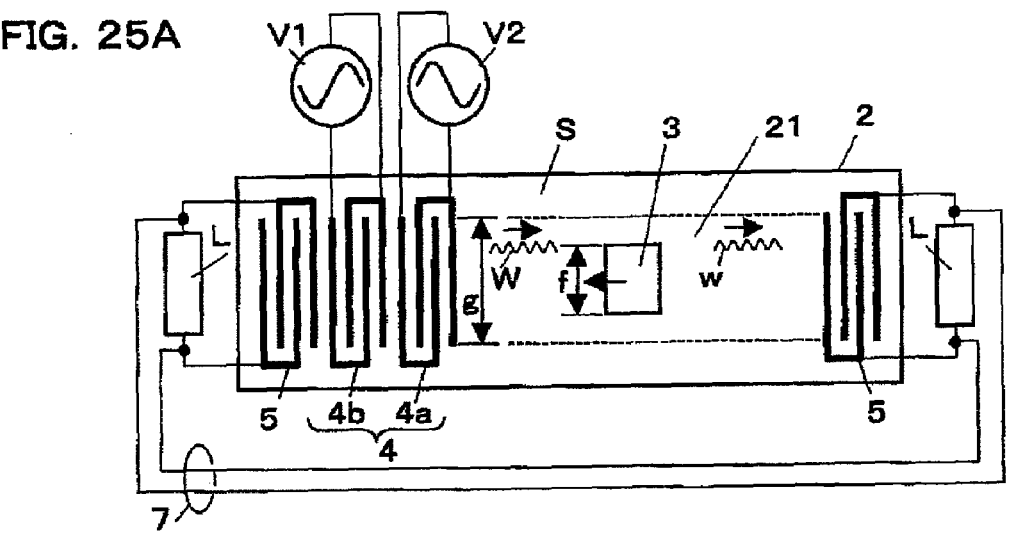
Figure 25B:
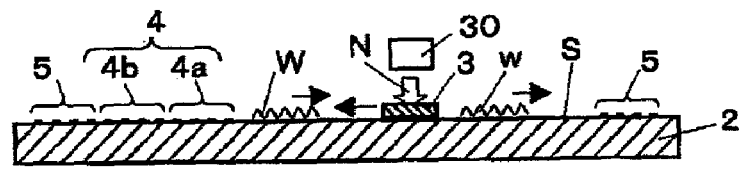
FIG. 25B is a cross-sectional view of the surface acoustic wave motor.

The surface acoustic wave substrate 2 and the slider 3 in the surface acoustic wave motor 1 of this embodiment are similar to those shown in the above-mentioned FIG. 1, and the description is omitted. Further, the structures of the interdigital electrodes are similar to those in the prior art shown in FIGS. 25A and 25B, and the description thereof is partially omitted. Note that a reflector can be added to each recovery interdigital electrode 5.

The wiring 7 forms the energy circulating means 11 in FIG. 1. The pair of recovery interdigital electrodes 5 together with the surface of the surface acoustic wave substrate 2 and the wiring 7 forms a closed circuit for energy circulation. Now, the impedance matching of the recovery interdigital electrodes 5 will be described. The pair of recovery interdigital electrodes 5 are normally formed in the same shape, so that based on their symmetry and duality, the impedance matching of the resistance component is naturally satisfied. Further, the respective recovery interdigital electrodes 5 have damping capacitances, respectively, which are required to be eliminated. Here, the respective damping capacitances of the recovery interdigital electrodes 5 can be eliminated by inserting inductors L in parallel to the respective recovery interdigital electrodes 5, achieving impedance matching (refer to Japanese Laid-open Patent Publication Hei 11-146665).

The phase adjusting circuit 8 is formed of a four-terminal circuit, and forms the phase adjusting means 10 in FIG. 1. The phase adjusting circuit 8 is formed e.g. of an electrical circuit having a passive element such as a resistor, a capacitor, an inductor or the like connected in series or in parallel, so as to make a phase adjustment of electrical energy circulating through the wiring 7. In other words, when the recovered energy is supplied to the recovery interdigital electrode 5 on the left to generate a surface acoustic wave W, the phase adjusting means 8 adjusts the phase of the electrical energy in advance so as to allow the phase of the generated wave to match the phase of a surface acoustic wave W generated by the driving interdigital electrode 4.

Next, the operation of the surface acoustic wave motor 1 will be described. In the above-mentioned state, when high frequency (MHz range) voltages of a predetermined frequency, $v1=v0 \cdot \cos \omega t$ and $v2=v0 \cdot \sin \omega t$, are applied to the interdigital electrodes 4a and 4b of the driving interdigital electrode 4 from the external power supplies V1 and V2, respectively, then the interdigital electrodes 4a and 4b generate a surface acoustic wave W which is a wave traveling on the surface S rightward in the drawing. In other words, this driving interdigital electrode 4 serves as a unidirectional interdigital electrode which can actively set the directivity. When the surface acoustic wave W directed rightward is excited, the slider 3 is driven leftward in the drawing. In this state, the surface acoustic wave W, whose part of energy has been consumed to drive the slider 3, becomes a surface acoustic wave w which travels rightward from the slider 3.

The recovery interdigital electrode 5 on the right receives a mechanical energy from the above-mentioned surface acoustic wave w, and recovers it as an electrical energy, so as to circulate the energy to the interdigital electrode 5 on the left via the wiring 7. At the time of the circulation, the phase adjusting circuit 8 adjusts the phase. The recovery interdigital electrode 5 on the left receives and at the same supplies the electrical energy to the surface acoustic wave substrate 2 as energy to generate a driving surface acoustic wave W. In other words, the pair of recovery interdigital electrodes 5, the wiring 7 and the phase adjusting circuit 8 perform the recovery, circulation, phase adjustment and supply of energy, while the driving interdigital electrode 4 complements the consumption of energy. A driving surface acoustic wave is generated based on these energies with the phases being aligned, so as to drive the slider 3.

The surface acoustic wave motor 1 provided with such a phase adjusting circuit 8 makes it possible to achieve an increase in the energy efficiency. Further, since it makes a phase adjustment in the form of electrical energy by using an electrical circuit, it is easy to make phase adjustments as desired, and also easy to adapt to size changes of the slider 3 and adapt to a fine adjustment to a mechanical phase adjustment.

Besides, in the above-mentioned surface acoustic wave motor 1, it is possible to excite a leftward traveling wave directed opposite to the surface acoustic wave W shown in FIG. 1 by inverting the voltage input of either of the external power supplies V1 and V2. This uses that the driving interdigital electrode 4 is a unidirectional interdigital electrode which can actively set the directivity. In this case, the recovery interdigital electrode 5 on the left directly recovers mechanical energy from the surface acoustic wave W, and converts it to electrical energy. The recovery interdigital electrode 5 on the right receives the electrical energy via the wiring 7, and supplies the energy as mechanical energy to the surface acoustic wave substrate 2. Consequently, in this case, the slider 3 moves rightward.

Second Embodiment

Figure 3A:
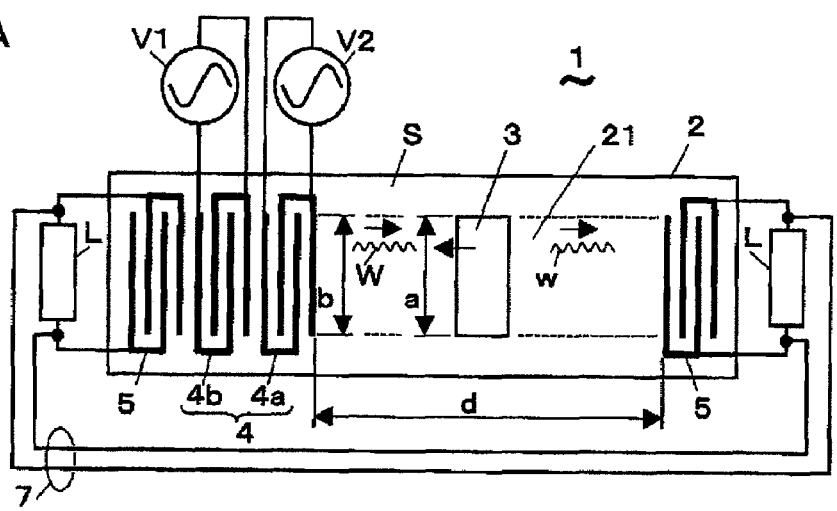
Figure 3B:
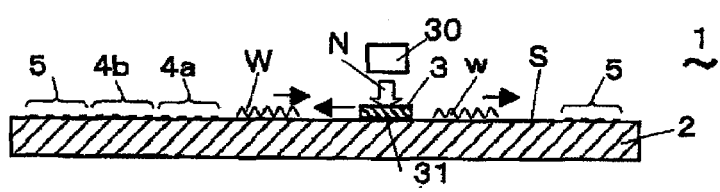
FIG. 3B is a cross-sectional view of the surface acoustic wave motor.
Figure 4A:
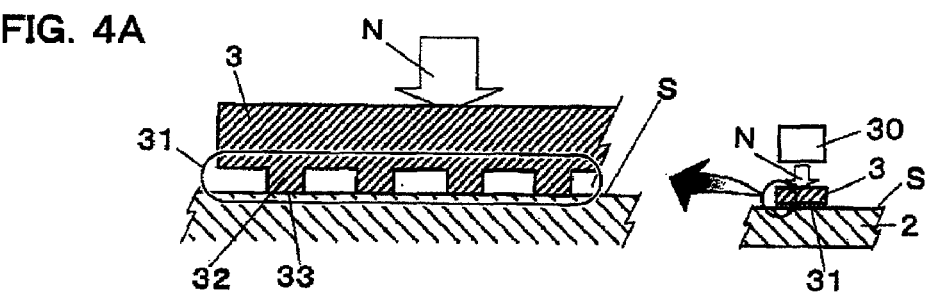
Figure 4B:
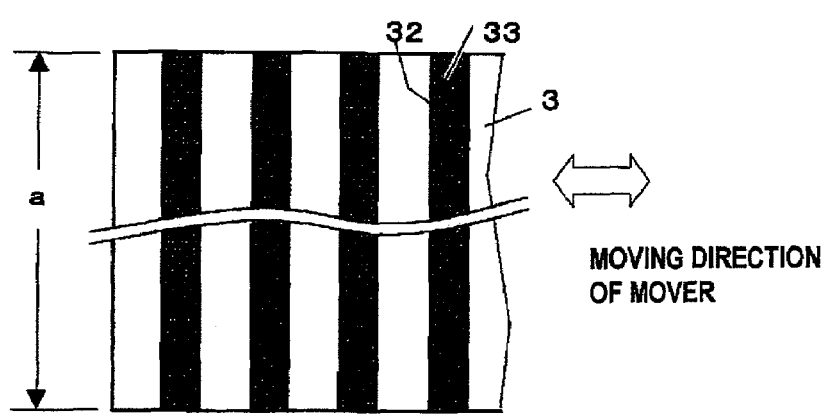
FIG. 4B is a plan view of the contact portion of the slider.

FIGS. 3A and 3B show a surface acoustic wave motor 1 of a second embodiment, while FIGS. 4A and 4B show a structure of a contact portion of a slider 3 with a surface acoustic wave substrate 2 in the surface acoustic wave motor 1. Differently from the above-mentioned surface acoustic wave motor 1 of the first embodiment, this surface acoustic wave motor 1 does not have a phase adjusting circuit 8. The phase adjustment in this surface acoustic wave motor 1 is made by an adjustment of the width of the slider 3 and the widths of the respective interdigital electrodes, and by an adjustment of the length of a region in which the surface acoustic waves W and w are present. In other words, the phase adjusting means 10 in this surface acoustic wave motor 1 uses a spatial adjustment process to make a phase adjustment before energy recovery. Except for these points, the surface acoustic wave motor 1 of the second embodiment is similar to the above-mentioned surface acoustic wave motor 1 of the first embodiment.

For the above-mentioned spatial phase adjustment, a width a of the slider 3 is set to be substantially the same in size as a width b of the respective interdigital electrodes. Here, the width a of the slider 3 is a width of a contact surface 31 of the slider 3 which contacts the surface S of the surface acoustic wave substrate 2, the width being in a width direction perpendicular to the direction of travel of the surface acoustic wave. On the other hand, the width b of the interdigital electrodes is an overlap width of the element electrodes. Within the region of this width b, the driving interdigital electrode 4 effectively generates surface acoustic waves, and the respective recovery interdigital electrodes recover energy.

As shown in FIGS. 4A and 4B, the contact surface 31 of the slider 3 has provided thereon contact projections 32 which are placed at predetermined intervals uniformly distributed over the entire width a of the contact surface 31 of the slider 3. Projected contact surfaces 33 on ends of the contact projections 32 are portions which actually contact the surface S of the surface acoustic wave substrate 2, and which generate a frictional force as a driving force.

According to the surface acoustic wave motor 1 of the present embodiment, the contact projections 32 provided on the contact surface 31 are uniformly distributed over the entire width a of the contact surface 31, while the width a of the slider 3 is set to be substantially the same as the electrode overlap width b. Thus, a surface acoustic wave w arriving at the recovery interdigital electrode 5 is a surface acoustic wave having the same phase along the width direction which is perpendicular to the direction of travel of the surface acoustic wave, so that an effective energy can be recovered to generate a driving surface acoustic wave W, achieving an increase in the energy efficiency.

Besides, in the surface acoustic wave motor 1 of the present embodiment, the spatial adjustment process is used for not only the above-mentioned phase adjustment along the width direction, but also a phase adjustment in a length direction. The width of the moving section 21 in which the slider is placed and driven to move is determined by the width a of the slider 3 as mentioned above. The length of the moving section 21 is set as below.

Generally, the moving section 21 is a region of the surface acoustic wave substrate 2 between ones of the respective recovery and driving interdigital electrodes 4 and 5. In the surface acoustic wave motor 1 of the present embodiment, the moving section 21 is a region between the driving interdigital electrode 4a and the recovery interdigital electrode 5 on the right. The distance between the interdigital electrodes 4 and 5, which sandwich the moving section 21 so as to generate a surface acoustic wave and recover its energy, is set to be a distance to generate a resonant-state surface acoustic wave for the purpose of efficiently circulating energy. Here, the generation of a resonant-state surface acoustic wave is equivalent to the generation of a surface acoustic wave with the periodic boundary conditions satisfied by the boundary between the generation side and the recovery side of the surface acoustic wave. In other words, this means that the phase of the surface acoustic wave at the time of recovering the surface acoustic wave is the same as that at the time of generating the surface acoustic wave.

Figure 26:
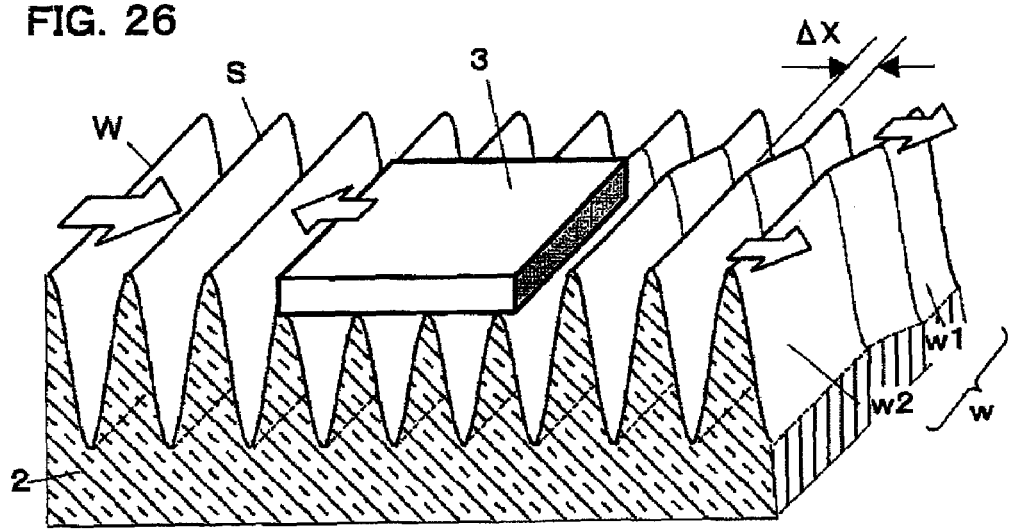
FIG. 26 is a schematic perspective view showing the relationship between a surface acoustic wave and a slider in a conventional surface acoustic wave motor.
Figure 27A:
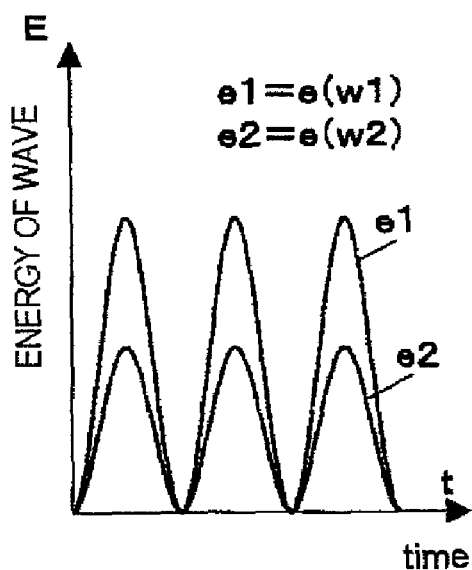
Figure 27B:
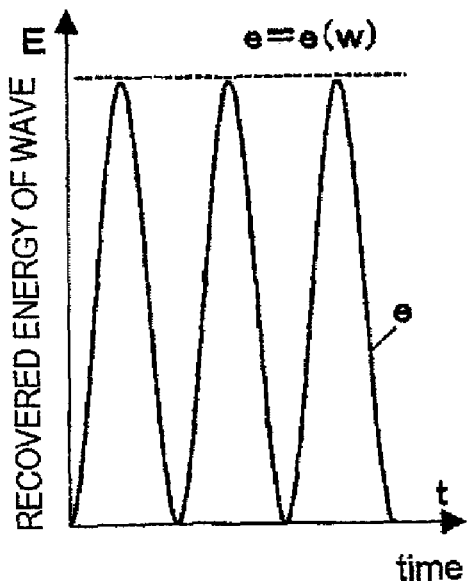
FIG. 27B is a graph showing the time variation of energy of a wave formed by combining the two surface acoustic waves.
Figure 28A:
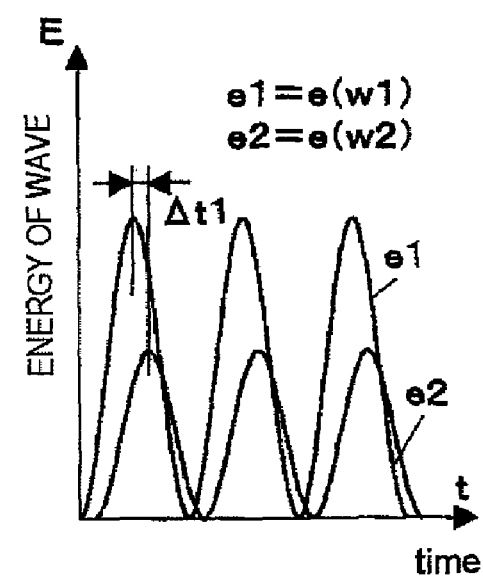
Figure 28B:
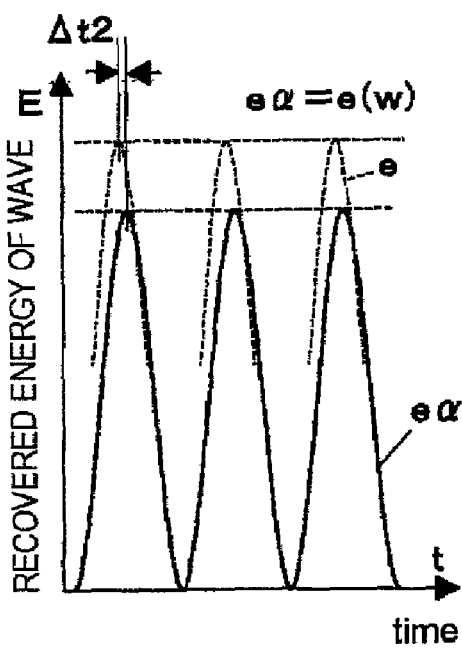
FIG. 28B is a graph showing the time variation of energy of a wave formed by combining the two surface acoustic waves.
Figure 29A:
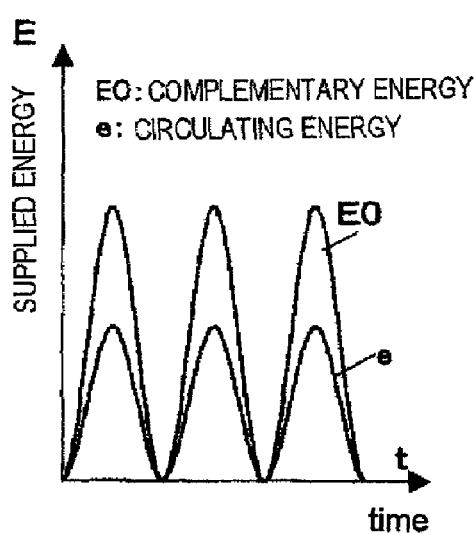
Figure 29B:
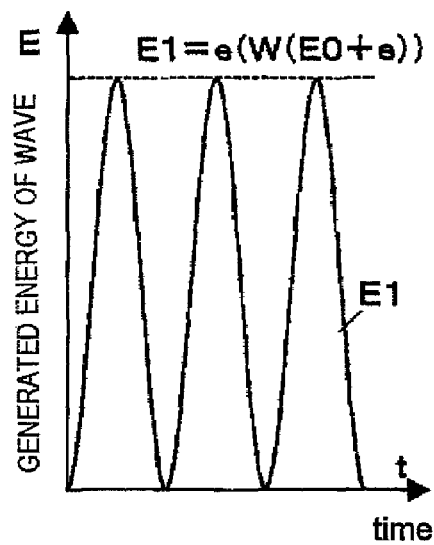
FIG. 29B is a graph showing the time variation of energy of a surface acoustic wave generated by the two energies.
Figure 30A:
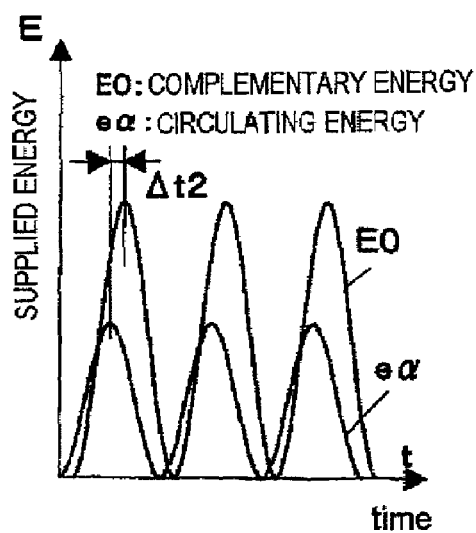
Figure 30B:
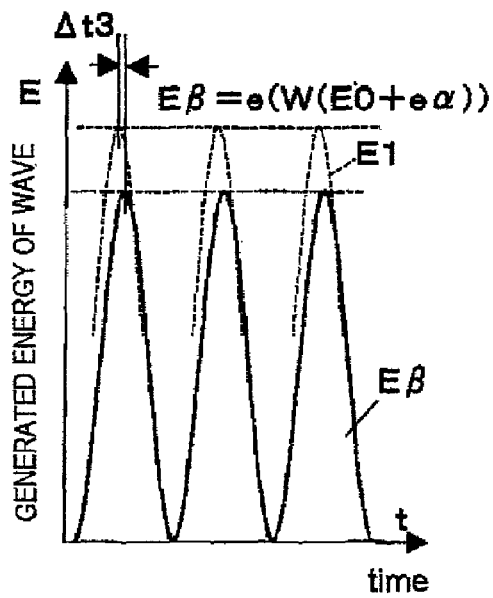
FIG. 30B is a graph showing the time variation of energy of a surface acoustic wave generated by the two energies.

Now, as shown in FIG. 26 of the prior art, when a contact object such as the slider 3 contacts the surface S on which a surface acoustic wave propagates, the phase of the surface acoustic wave changes at the contact portion. Thus, in order to achieve the above-mentioned periodic boundary conditions in the surface acoustic wave motor 1 of the present embodiment while the motor is driven, the length of the moving section 21 is set to be a length with preliminary addition of a distance corresponding to an amount of phase change caused in the surface acoustic wave by the placement of the slider 3.

More specifically, a moving section length d which is a distance between the interdigital electrodes 4 and 5 sandwiching the moving section 21 is set at a sum length of a distance between the electrodes, which is referred to as $d\theta$, to generate a resonant-state surface acoustic wave in the moving section 21 without placing the slider 3 in the moving section 21 plus a phase difference $\Delta X$ (refer to FIG. 26) which is a distance corresponding to an amount of phase change caused in the resonant-state surface acoustic wave by the placement of the slider 3 in the moving section 21, that is $d=d0+\Delta X$. Here, $\Delta X$ is added to d0, considering the plus or minus sign thereof. Here, the distances d0 and d between the electrodes are generally not necessarily distances between the patterned electrodes, but are distances to achieve the resonant state essentially or effectively.

As mentioned above, in the surface acoustic wave motor 1 of the present embodiment, the phase adjusting means 10, which is based on the spatial phase adjustment process, makes two kinds of phase adjustments before recovery of the energy of the surface acoustic wave w, achieving an efficient operation with a small energy loss, thereby making it possible to achieve an increase in the energy efficiency. One of the two kinds of phase adjustments is an adjustment to bring the recovered surface acoustic wave w to a single phase state, while the other one is an adjustment to satisfy the periodic boundary conditions.

Third Embodiment

Figure 5A:
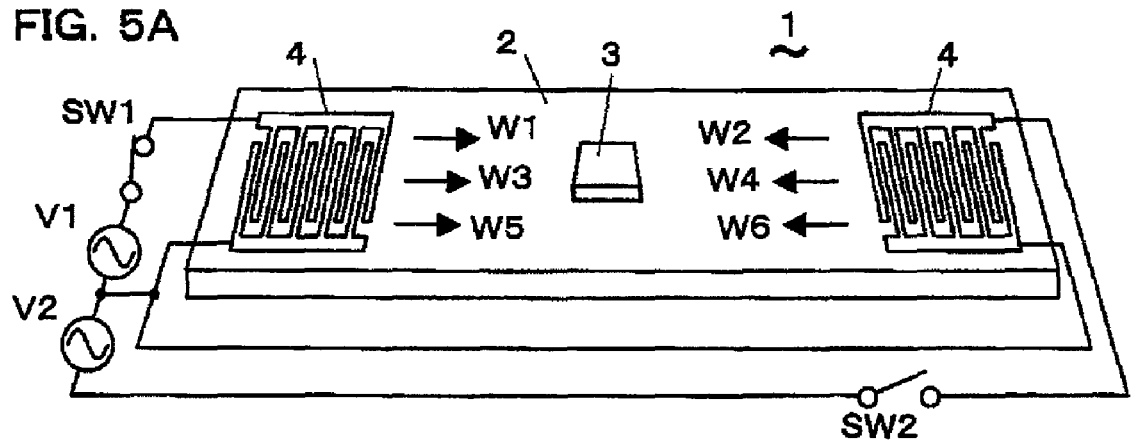
Figure 5B:
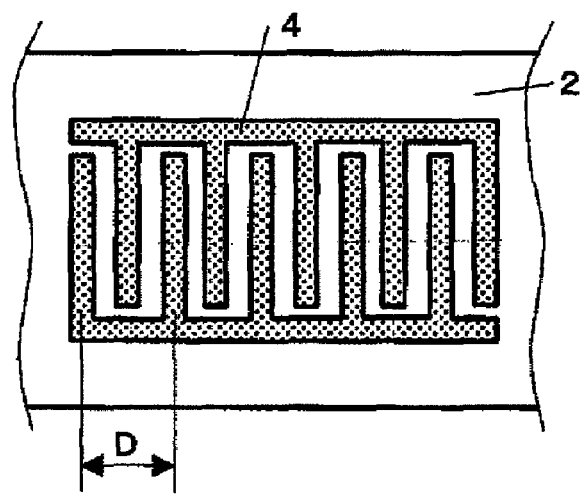
FIG. 5B is a plan view of a main portion of the surface acoustic wave motor.
Figure 5C:
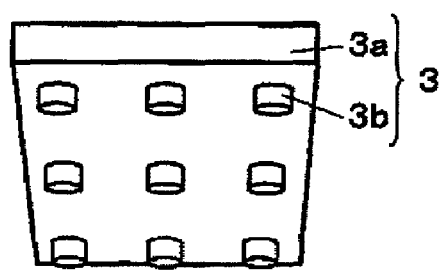
FIG. 5C is a perspective view of a slider.
Figure 6A:
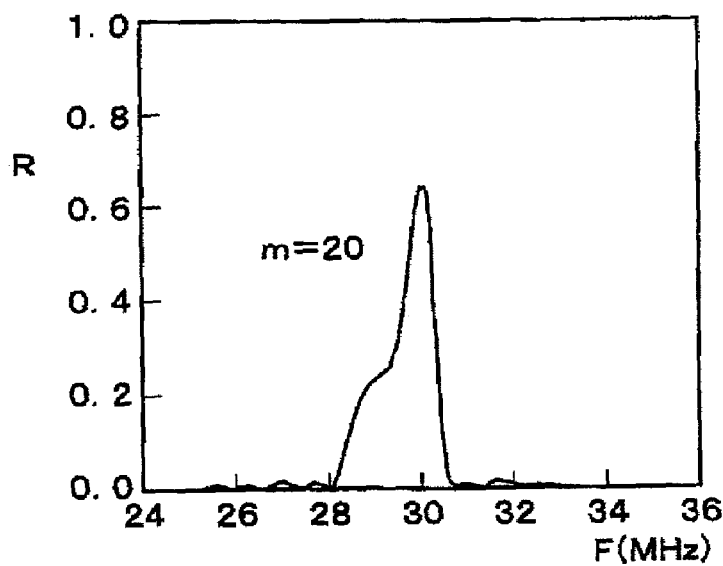
FIG. 6A is a graph of the frequency characteristics of the reflectivity of an interdigital electrode.
Figure 6B:
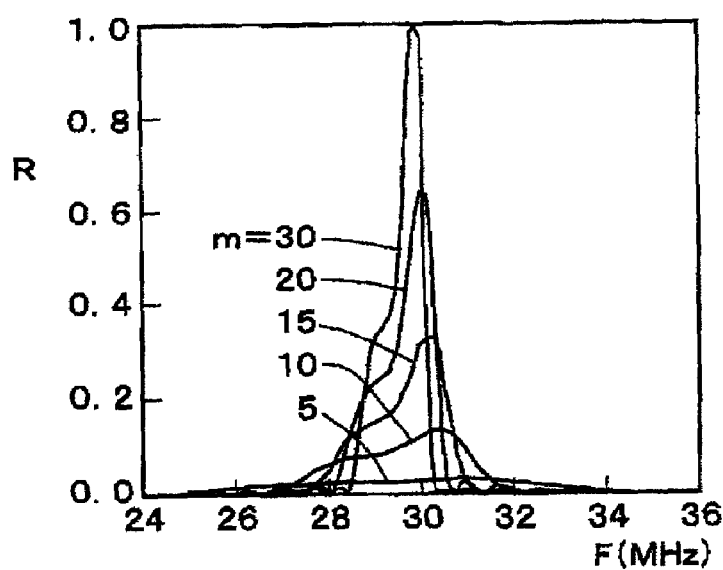
Figure 6C:
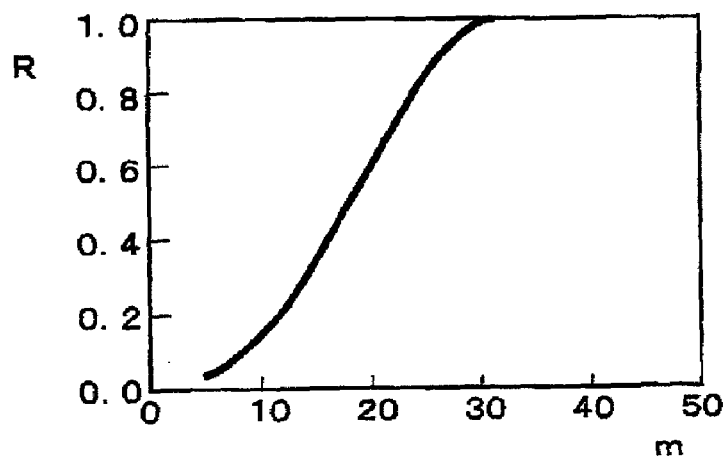
FIG. 6C is a graph showing a relationship between the number of pairs and the maximum value of the reflectivity.

FIGS. 5A to 5C show a surface acoustic wave motor 1 of a third embodiment, while FIGS. 6A to 6C show reflectivity characteristics of interdigital electrodes. The surface acoustic wave motor 1 of the present embodiment circulates recovered energy in the form of mechanical energy to the supply side. This is the point in which it is different from the surface acoustic wave motors 1 of the above-mentioned first and second embodiments. More specifically, the recovery and circulation of energy are performed by a surface acoustic wave traveling reversely on a surface S of a surface acoustic wave substrate 2, namely as a reflected wave, in the form of mechanical energy, not in the form of electrical energy. The energy circulating means 11 in the present embodiment is the surface S of the surface acoustic wave substrate 2.

The surface acoustic wave motor 1 of the present embodiment comprises: the surface acoustic wave substrate 2; a pair of interdigital electrodes 4 placed opposite to, and at a predetermined distance from, each other on the surface S of the surface acoustic wave substrate 2 for generating a surface acoustic wave on the surface acoustic wave substrate 2; a slider 3 placed on the surface S between the interdigital electrodes 4 and driven by the surface acoustic wave; and pressure applying means (not shown) for contacting the slider 3 to the surface S by a predetermined applied pressure N.

The basic structures of the surface acoustic wave substrate 2, the pressure applying means and so on are similar to those shown in the above-mentioned FIG. 1 and the first embodiment, and the description is omitted. Referring to FIG. 5C, the slider 3 is formed by e.g. silicon or the like, and integrally has a substantially parallelepiped main body $3a$ and multiple projections $3b$ formed on and projecting from a surface of the main body $3a$, which is placed facing the surface S, so as to facilitate obtaining thrust from the surface S of the surface acoustic wave substrate 2.

Furthermore, the pair of interdigital electrodes 4 of the surface acoustic wave motor 1 serves as the driving interdigital electrode 4 for generating a driving surface acoustic wave, and also serves as the recovery interdigital electrodes 5 for reflecting the surface acoustic wave to recover and supply the energy of the surface acoustic wave, which are shown in FIG. 1. In FIGS. 5A and 5B, the interdigital electrodes 4 are simplified for illustration. A reflector and the like can be added to the pair of interdigital electrodes 4 to allow them to serve as unidirectional interdigital electrodes (refer to fifth and sixth embodiments).

In the interdigital electrodes 4, the interdigital electrode 4 on the left is connected to both ends of an external power supply V1 via a switch SW1, while the interdigital electrode 4 on the right is connected to both ends of an external power supply V2 via a switch SW2. The switches SW1 and SW2 serve as switching means for switching between the interdigital electrodes 4 which generate surface acoustic waves. In other words, by switching the switches, the direction of travel of the surface acoustic wave on the surface acoustic wave substrate 2, hence the direction of movement of the slider 3, can be switched.

The pair of interdigital electrodes 4 are placed facing each other on the surface S so as to allow the distance between equivalent reflecting surfaces of the both interdigital electrodes 4 to be an integer multiple of a half wavelength of the surface acoustic wave excited by the interdigital electrode 4. In other words, a distance d between the equivalent reflecting surfaces is set so as to satisfy the relation $d = n \times \lambda/2$ (n: natural number) where $\lambda$ is a wavelength of the surface acoustic wave, and d is a distance between the equivalent reflecting surfaces. Here, an equivalent reflecting surface means a reflecting surface placed at a representative position of reflection caused by the interdigital electrode 4, paying attention to the function of the interdigital electrode 4 to reflect a surface acoustic wave, just as in physics an object with a finite volume is replaced by a mass point.

By setting the distance d between the equivalent reflecting surfaces at an integer multiple of the half wavelength as mentioned above, all of a surface acoustic wave W1 excited by the interdigital electrode 4 on the left to travel rightward as well as surface acoustic waves W3, W5, W7, and so on reflected by the respective interdigital electrodes 4 in multi-reflection to consequently travel rightward have the same phase. Likewise, thereby, all of surface acoustic waves W2, W4, W6, and so on to travel leftward have the same phase. Further, it is possible to allow all of these surface acoustic waves W1, W2, and so on to have the same phase. The phase adjusting means 10 in the present embodiment uses a spatial adjustment process.

(Design of Interdigital Electrode)

next, a design method for the respective interdigital electrodes 4 will be described. In the interdigital electrodes 4, the resonant frequency of an interdigital electrode to generate a surface acoustic wave is determined by a distance D, i.e. pitch, between the element electrodes of the same polarity. Further, the frequency characteristics of reflectivity R of a wave vary with the number m of pairs of element electrodes of opposite polarities. The pair number m of the interdigital electrodes 4 shown simplified in FIG. 5A is m=5. The relationships of these distance D and pair number m to the resonant frequency of the interdigital electrodes 4, admittance characteristics (conductance and susceptance) and frequency characteristics of reflectivity R of the interdigital electrodes 4 can be obtained by computer simulation. This makes it possible to design interdigital electrodes 4 having a resonant frequency and characteristics of reflectivity as desired.

For example, if distance D=132.64 μm and pair number m=20, a resonant frequency (conductance peak) f0 of the interdigital electrode 4 is obtained as f0=28.9 MHz. In this case, an interdigital electrode having the reflectivity characteristics as shown in FIG. 6A can be obtained. It is understood that this interdigital electrode has a reflectivity of about 0.21 for a surface acoustic wave having a frequency of 28.9 MHz. Here, an increase in the distance D reduces the resonant frequency, which causes the overall frequency characteristics of the reflectivity R to shift to the lower frequency side, while a reduction in the distance D increases the resonant frequency, which causes the overall frequency characteristics of the reflectivity R to shift to the higher frequency side.

In designing the interdigital electrodes 4, first, the distance D is tentatively set so that the frequency characteristics of the reflectivity R are close to desired values. After the frequency characteristics of the reflectivity R are roughly set by the tentative setting of the distance D, the pair number m is changed so as to set the magnitude of reflectivity R. FIG. 6B shows the reflectivity characteristics when the pair number m is changed from m=5 to 30. In this case, the distance D is D=132.64 μM. Further, FIG. 6C shows the relationship between the value of the pair number m and the maximum value of the reflectivity R.

It is understood that the maximum value of the reflectivity R can be increased by increasing the pair number m, and that when the pair number m exceeds 30, the reflectivity R becomes about 1. Furthermore, as apparent from FIG. 6B, when the pair number m is changed, the frequency giving the maximum value of the reflectivity R gradually shifts to the lower frequency side. Thus, if the frequency giving the maximum value of the reflectivity R shifts from the desired value, the distance D is to be reset, after the pair number m is determined, so as to allow the reflectivity at the desired frequency to become maximum, thereby resetting the optimum distance D.

By thus setting the distance D and the pair number m, it is possible to design interdigital electrodes 4 having a resonant frequency and frequency characteristics of reflectivity R as desired.

(Energy of Multi-Reflected Waves)

When the switch SW0 is closed to apply a high frequency voltage to the above-mentioned interdigital electrode 4 from the external power supply V1 so as to excite a surface acoustic wave W1 with energy P, a multi-reflected wave as shown below is generated in the surface acoustic wave substrate 2. Here, the reflectivity of the interdigital electrode 4 on the left and the reflectivity of the interdigital electrode 4 on the right for a surface acoustic wave having the same frequency as the surface acoustic wave W1 are referred to as $\eta(0<\eta\leq 1)$ and $\gamma(0\leq\gamma\leq 1)$, respectively, while the attenuation of the surface acoustic wave during propagation is assumed to be negligible.

That is, when a surface acoustic wave W1 excited by the interdigital electrode 4 on the left arrives at the interdigital electrode 4 on the right, a part of it is reflected to become a surface acoustic wave W2 with energy $\gamma P$. When the surface acoustic wave W2 arrives at the interdigital electrode 4 on the left, a part of it is reflected to become a surface acoustic wave W3 with energy $\gamma\eta P$. Such reflections are repeated in a similar manner.

As mentioned above, the respective surface acoustic waves W1, W3, and so on directed rightward have the same phase, and the energy PF of the traveling wave WF composed of the sum of these waves is the total sum of the energies of the respective waves, so that $PF=P(1+\gamma\eta+(\gamma\eta)^2+\ldots)$. Further, the respective surface acoustic waves W2, W4, and so on directed leftward have the same phase, and the energy PR of the reflected wave WR composed of the sum of these waves is the total sum of the energies of the respective waves, so that $PR=\gamma P(1+\gamma\eta+(\gamma\eta)^2+\ldots)$. Generally, $\gamma\eta<1$, so that the energies PF and PR are calculated using the geometric series formula as:

$$PF=P/(1-\gamma\eta)$$

$$PR=\gamma P/(1-\gamma\eta)$$

On the other hand, the total energy PS generated in the surface acoustic wave substrate 2 is a sum of the energy PF of the traveling wave WF and the energy PR of the reflected wave WR, that is, PS=PF+PR. If an energy therein which contributes to the movement of the slider 3 is referred to as a traveling wave component PH, then PH=PF−PR. On the other hand, if an energy which does not contribute to the movement of the slider 3 is referred to as a standing wave component PV, then PV=PS−PH. Thus, PF, PR, PS, PH and PV have the relations:

$$PS=PF+PR=(1+\gamma)P/(1-\gamma\eta)$$

$$PH=PF-PR=(1-\gamma)P/(1-\gamma\eta)$$

$$PV=PS-PH=2PR=2\gamma P/(1-\gamma\eta)$$

As seen from the equations above for PF, PR, PS, PH, PV, and so on, the surface acoustic wave motor 1 of the present embodiment makes it possible to set a ratio of the traveling wave component PH to the standing wave component PV by adjusting the reflectivities $\eta$ and $\gamma$. Further, by setting the reflectivity $\gamma$ of the interdigital electrode 4 on the right, the energy PF of the traveling wave WF can be made higher than the energy PR of the reflected wave WR, that is, PF>PR (hence PH=PF−PR>0). As mentioned above, the reflectivity $\gamma$ can be set by the distance D and the pair number m of the interdigital electrode.

It is preferable to set the above-mentioned reflectivity $\gamma$ so that, for example, the energy PR of the reflected wave WR is from 0.5 to 0.98 as high as the energy PF of the traveling wave WF. Referring to the equations above for PH and PV, the value of the reflectivity $\gamma$ at this time is to be in a range of $0.5\leq\gamma\leq 0.98$. Note that the conditions in which the switch SW2 is closed instead of the switch SW1 to connect the external power supply V2 to the interdigital electrode 4 on the right so as to move the slider 3 rightward are similar to the above, and the description is omitted.

(Operation of Surface Acoustic Wave Motor)

Next, the operation of the surface acoustic wave motor 1 will be described. When the switch SW1 is closed to apply a high frequency voltage to the interdigital electrode 4 on the left from the external power supply V1, distortion is generated in the surface acoustic wave substrate 2 by the electrical energy supplied from the interdigital electrode 4. Thus, the electrical energy is converted to mechanical energy, thereby generating a Rayleigh wave which is a surface acoustic wave. The Rayleigh wave propagates on the surface S of the surface acoustic wave substrate 2, and is multi-reflected between the two interdigital electrodes 4 such that, in a steady state, a traveling wave WR traveling rightward and a reflected wave WR traveling leftward are generated. Such a surface acoustic wave has a standing wave component PV and a traveling wave component PH. The slider 3 is moved leftward by the energy of the traveling wave component PH. Further, the surface acoustic wave motor 1 can drive the slider 3 left and right by switching the switches SW1 and SW2.

Fourth Embodiment

Figure 7A:
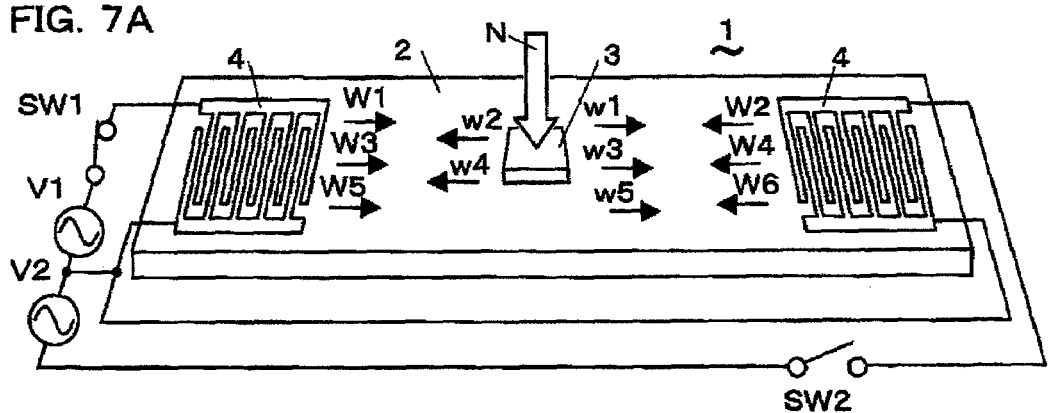
Figure 7B:
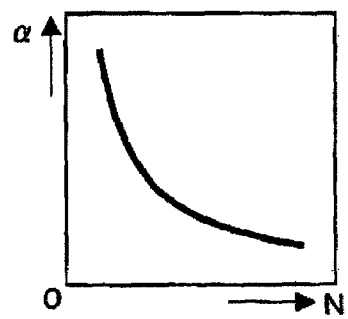
FIG. 7B is a graph showing a relationship between applied pressure provided to a slider and a transmission factor of a surface acoustic wave.

FIG. 7A shows a surface acoustic wave motor 1 of a fourth embodiment, while FIG. 7B shows a relationship between applied pressure N provided to a slider 3 and a transmission factor $\alpha$ of surface acoustic wave. The surface acoustic wave motor 1 of the present embodiment has a structure similar to the above-mentioned third embodiment, and is different in that the influence of the magnitude of the applied pressure N provided to the slider 3 on the propagation of surface acoustic wave is considered, with the other points being similar.

More specifically, surface acoustic waves w1, w2, w3, w4, and so on which pass, from the left or right, through the surface S of a surface acoustic wave substrate 2 contacting the slider 3 are attenuated with a part of the energy thereof being consumed. The amount of attenuation increases with the applied pressure N to the slider 3. Further, as shown in FIG. 7B, the transmission factor $\alpha$ of the surface acoustic wave energy passing through the lower surface of the slider 3 decreases as the applied pressure N increases.

Now, taking into account the transmission factor $\alpha$ ($0<\alpha<1$) of the surface acoustic wave depending on the applied pressure N to the slider 3, the following describes about a multi-reflected wave in a steady state generated when a surface acoustic wave W1 with energy P is excited by applying a high frequency voltage to the interdigital electrode 4 on the left. Similarly as described above, the reflectivity of the interdigital electrode 4 on the left and the reflectivity of the interdigital electrode 4 on the right for a surface acoustic wave having the same frequency as the surface acoustic wave W1 are referred to as $\eta(0<\eta\leq1)$ and $\gamma(0<\gamma\leq1)$, respectively, while the attenuation of the surface acoustic wave during propagation is assumed to be negligible.

More specifically, as shown in FIG. 7A, the surface acoustic wave W1 with energy P travels rightward, and passes through the slider 3 to become a surface acoustic wave w1 with energy $\alpha$P, and is then further reflected by the interdigital electrode 4 on the right to become a surface acoustic wave W2 with energy $\gamma\alpha$P. The surface acoustic wave W2 passes through the slider 3 to become a surface acoustic wave w2 with energy $\gamma\alpha^2$P, and is then reflected by the interdigital electrode 4 on the left to become a surface acoustic wave W3 with energy $\gamma\eta\alpha^2$P. Such reflections are repeated in a similar manner.

The energy PF of the wave WF traveling rightward is the total sum of the energies of the surface acoustic waves W1, W3, and so on, so that $PF=P(1+\gamma\eta\alpha^2+(\gamma\eta\alpha^2)^2+\ldots)$. Further, the energy PR of the reflected wave WR traveling leftward is the total sum of the energies of the surface acoustic waves W2, W4, and so on, so that $PR=\gamma\alpha P(1+\gamma\eta\alpha^2+(\gamma\eta\alpha^2)^2+\ldots)$. Generally, $\gamma\eta\alpha^2<1$, so that the energies PF and PR are calculated using the geometric series formula as:

$$PF=P/(1-\gamma\eta\alpha^2)$$

$$PR=\gamma\alpha P/(1-\gamma\eta\alpha^2)$$

Thus, similarly as above, a total energy $PS=PF+PR$ generated in the surface acoustic wave substrate 2, a traveling wave component PH as an energy contributing to the movement of the slider 3, and a standing wave component PV as an energy not contributing to the movement of the slider 3 have the relations:

$$PS=PF+PR=(1+\gamma\alpha)P/(1-\gamma\eta\alpha^2)$$

$$PH=PF-PR=(1-\gamma\alpha)P/(1-\gamma\eta\alpha^2)$$

$$PV=PS-PH=2PR=2\gamma\alpha P/(1-\gamma\eta\alpha^2)$$

As seen from the equations above, the surface acoustic wave motor 1 of the present embodiment makes it possible to set a ratio of the traveling wave component PH to the standing wave component PV by adjusting the transmission factor $\alpha$ in addition to the reflectivities $\eta$ and $\gamma$. The setting of the transmission factor $\alpha$ can be made by setting the applied pressure N provided by the pressure applying means. Further, it is preferable to set the values of the reflectivity $\gamma$ and the transmission factor $\alpha$ so that the energy PR of the reflected wave WR is from 0.5 to 0.98 as high as the energy PF of the traveling wave WF, such as to satisfy $0.5\leq\gamma\alpha\leq0.98$.

Fifth Embodiment

Figure 8A:
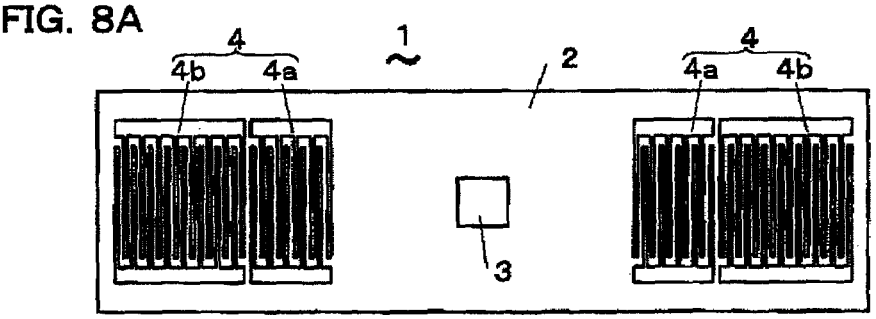
Figure 8B:
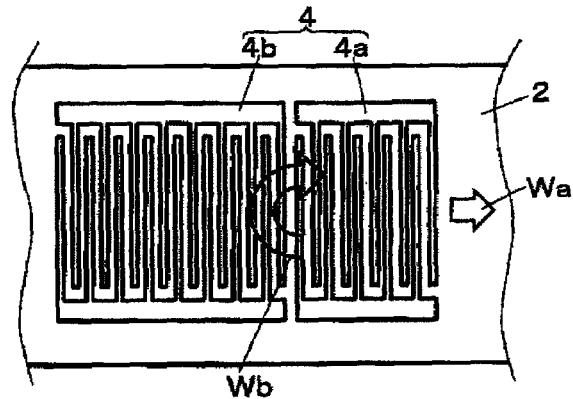
FIG. 8B is an explanatory view of a main portion of the surface acoustic wave motor.
Figure 9A:
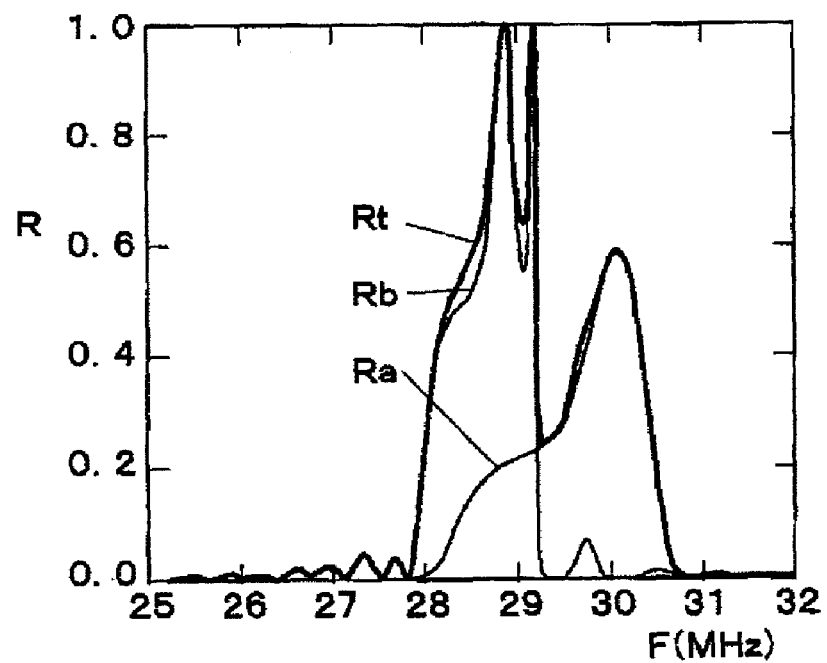
Figure 9B:
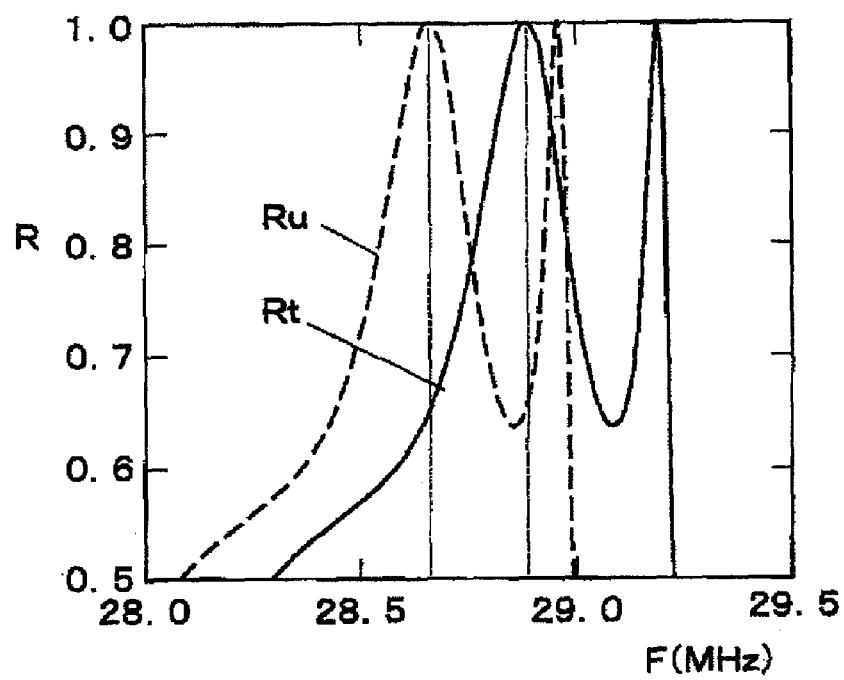
FIG. 9B is a graph of the frequency characteristics of the respective reflectivities of a pair of unidirectional interdigital electrodes of the surface acoustic wave motor.

FIGS. 8A and 8B show a surface acoustic wave motor 1 of a fifth embodiment, while FIGS. 9A and 9B show reflectivities of a unidirectional interdigital electrode of the surface acoustic wave motor 1. The surface acoustic wave motor 1 of the present embodiment is such that unidirectional interdigital electrodes are used as the interdigital electrodes 4 in the above-mentioned third and fourth embodiments.

The interdigital electrodes 4 are formed by providing an interdigital electrode 4a for exciting a surface acoustic wave and a reflection electrode 4b for giving unidirectionality. In other words, reflection electrodes 4b are provided outside the left and right interdigital electrodes 4 in the above-mentioned third and fourth embodiments. The positional relationship of the left and right interdigital electrodes 4 as well as e.g. the external power supplies V1 and V2 and the switches SW1 and SW2 (not shown) connected to them are similar to those in the above-mentioned third and fourth embodiments. The reflection electrodes 4b are interdigital electrodes structured similarly as the interdigital electrodes 4a.

Before describing the reflection electrodes 4b, the excitation interdigital electrodes 4a will be described. The following description refers to the interdigital electrode 4 on the left as shown in FIG. 8B. The interdigital electrode 4a is assumed to be left-right symmetric. The interdigital electrode 4a excites two kinds of waves, a surface acoustic wave Wa traveling rightward and a surface acoustic wave Wb traveling leftward, each having the same energy which is referred to as P/2. The reflectivity for a surface acoustic wave incident on the interdigital electrode 4a is referred to as Ra, while the reflectivity for a surface acoustic wave incident on the reflection electrode 4b is referred to as Rb.

Then, the total sum PT of energy of the surface acoustic wave traveling rightward from the interdigital electrode 4a is:

$$PT=P/2+P(1-Ra)Rb/(1-RaRb)/2$$

Here, the total sum PT of energy approaches P as Rb approaches 1, so that the reflectivity Rb of the reflection electrode 4b is preferably as close to 1 as possible. Thus, a simulation is performed so that the reflectivity Rb=1 is approached for a surface acoustic wave with a frequency of 28.9 MHz, which is an excitation frequency of the interdigital electrode 4a, so as to set the distance D between, and the pair number m of, the element electrodes of the reflection electrode 4b.

For example, if the distance D is set to be 136.6 μm and the pair number m is set to be 40, a reflection electrode 4b having a reflectivity of 0.999 for the surface acoustic wave with a frequency of 28.9 MHz can be obtained as shown by Rb in FIG. 9A. According to FIG. 9A, the reflectivity Ra of the interdigital electrode 4a for the surface acoustic wave with a frequency of 28.9 MHz is about 0.20. The total reflectivity Rt of this interdigital electrode 4 is given by the equation:

$$Rt=Ra+(1-Ra)^2/(1-RaRb)$$

The interdigital electrode 4a and the reflection electrode 4b having thus been set in the distance D and the pair number m, respectively, are placed on the surface acoustic wave substrate 2 at a predetermined distance from each other so as to form the interdigital electrode 4. Now, assuming that the distance between the electrodes 4a and 4b (distance between element electrodes of opposite polarities) is varied, a result is obtained that when this distance is an integer multiple of the half wavelength of the surface acoustic wave excited by the interdigital electrode 4a, the admittance for a high frequency current for driving the interdigital electrode 4a becomes maximum. This is because a surface acoustic wave Wa excited by the interdigital electrode 4a to travel rightward and a surface acoustic wave once traveling leftward and reflected by the reflection electrode 4b to pass through the interdigital electrode 4a and the travel rightward are superimposed on each other in the same phase to facilitate the current flow. Thus, preferably, the distance between these electrodes 4a and 4b is a distance which is essentially equal to an integer multiple of the half wavelength.

The interdigital electrode 4 on the left is designed in the above-mentioned manner. The interdigital electrode 4 on the right is also similarly designed. However, as a condition different from the design of the interdigital electrode 4 on the left, the interdigital electrode 4 on the right is designed to be able to obtain a traveling wave component PH as described in the above-mentioned third and fourth embodiments. This is because if e.g. the distance D and the pair number m of the interdigital electrode 4 on the right are the same as those on the left, the reflectivity Rt becomes 0.999 which causes the traveling wave component PH to be significantly reduced whereby it becomes impossible to move the slider 3 in the surface acoustic wave motor 1 to recover energy by the multi-reflection.

Thus, the distance D and the pair number m in the interdigital electrode 4a and the reflection electrode 4b of the interdigital electrode on the right are set as follows. More specifically, the distance D and the pair number m are set so that the resonant frequency of the interdigital electrode 4a on the right has a value to reduce the reflectivity in the interdigital electrode 4 on the left, and so that the reflectivity of the interdigital electrode 4a on the right for the frequency of 28.9 MHz is reduced. For example, the distance D and the pair number m are set at 133.84 μm and 20, respectively, so that the resonant frequency of the interdigital electrode 4a is 28.64 MHz.

Next, the reflection electrode 4b on the right is designed similarly as above. Similarly as above, this reflection electrode 4b preferably has a reflectivity as close to 1 as possible for a surface acoustic wave excited by the interdigital electrode 4a. The distance D and the pair number m of the reflection electrode 4b are set by simulation to have a reflectivity as close to 1 as possible for a surface acoustic wave with a frequency of 28.64 MHz. For example, the distance D and the pair number m are set at about 137.69 μm and 40, respectively. This makes it possible to obtain a reflection electrode 4b having a reflectivity of 0.999 for a surface acoustic wave with a frequency of 28.64 MHz.

In the above manner, the interdigital electrodes 4 on the left and right are designed whereby the reflectivity Rt of the interdigital electrode 4 on the left and reflectivity Ru of the interdigital electrode 4 on the right have frequency characteristics as shown in FIG. 9B. As seen from FIG. 9B, the interdigital electrode 4 on the left has a reflectivity of about 1 for a surface acoustic wave with a frequency of 28.9 MHz excited by itself (Rt=about 1 at 28.9 MHz), and has a reflectivity of about 0.64 for a surface acoustic wave with a frequency of 28.64 MHz excited by the interdigital electrode 4 on the right (Rt=about 0.64 at 28.64 MHz). Further, the interdigital electrode 4 on the right has a reflectivity of about 1 for a surface acoustic wave with a frequency of 28.64 MHz excited by itself (Ru=about 1 at 28.64 MHz), and has a reflectivity of about 0.64 for a surface acoustic wave with a frequency of 28.9 MHz excited by the interdigital electrode 4 on the left (Ru=about 0.64 at 28.9 MHz).

A feature of the interdigital electrode 4 on the left, based on the fact that it is a unidirectional electrode, will now be described. When a predetermined high frequency voltage is applied to the interdigital electrode 4a of the interdigital electrode 4 on the left, then a surface acoustic wave Wa traveling rightward and a surface acoustic wave Wb traveling leftward are excited from the interdigital electrode 4a as shown in FIG. 8B. Both of these surface acoustic waves Wa and Wb have a frequency of 28.9 MHz and an energy of P/2. In the above-mentioned third and fourth embodiments, the surface acoustic wave Wb is propagated, as is, to a left end of the surface acoustic wave substrate 2 and converted to heat as waste. In the present embodiment, the reflection electrode 4a is provided, so that the surface acoustic wave Wb can be reflected rightward for effective use. Accordingly, with the same power input, it is possible to excite a driving surface acoustic wave with an energy about twice as high as in the third and fourth embodiments. This similarly applies to the interdigital electrode 4 on the right as well.

Furthermore, the distances D in the respective interdigital electrodes 4 are set to allow them to have resonant frequencies different from each other so that the interdigital electrode 4 on the right has a reflectivity of Ru—0.64 for a surface acoustic wave with a frequency of 28.9 MHz excited by the interdigital electrode 4 on the left. Thus, when the interdigital electrode 4 on the left is excited, a surface acoustic wave having a traveling wave component PH and a standing wave component PV with sufficient amplitude can be applied to the slider 3.

Similarly, the interdigital electrode 4 on the left has a reflectivity of Rt=about 0.64 for a surface acoustic wave with a frequency of 28.64 MHz excited by the interdigital electrode 4 on the right. Thus, when the interdigital electrode 4 on the right is excited, a surface acoustic wave having a traveling wave component PH and a standing wave component PV with sufficient amplitude can be applied to the slider 3.

As described in the foregoing, the surface acoustic wave motor 1 of the present embodiment can, in addition to the advantages similar to those of the third and fourth embodiments, excite a driving surface acoustic wave with an energy about twice as high as in the interdigital electrodes 4 of the third and fourth embodiments by using the interdigital electrodes 4 composed of the unidirectional electrodes, which comprise excitation interdigital electrodes 4a and reflection electrodes 4b, making it possible to drive the slider 3 with a further lower power. In addition, the resonant frequencies in the respective interdigital electrodes 4 are differentiated so as to reduce the decrease of the traveling wave component PH due to the reflected wave, so that a sufficient traveling wave component PH to move the slider 3 can be obtained. Thus, the slider 3 can be securely moved in the surface acoustic motor 1 to perform energy recovery of the multi-reflection type.

Sixth Embodiment

FIG. 10, FIG. 11 and FIGS. 12A and 12B show three kinds of examples of structures of unidirectional interdigital electrodes 4. Similarly as above, the unidirectional interdigital electrode 4 shown in FIG. 10 is formed of an excitation interdigital electrode 4a and a reflection electrode 4b. However, the reflection electrode 4b of this interdigital electrode 4 is formed of a ladder-shaped electrode in contrast to the reflection electrode 4b of the interdigital electrode in FIG. 8A.

Figure 11:
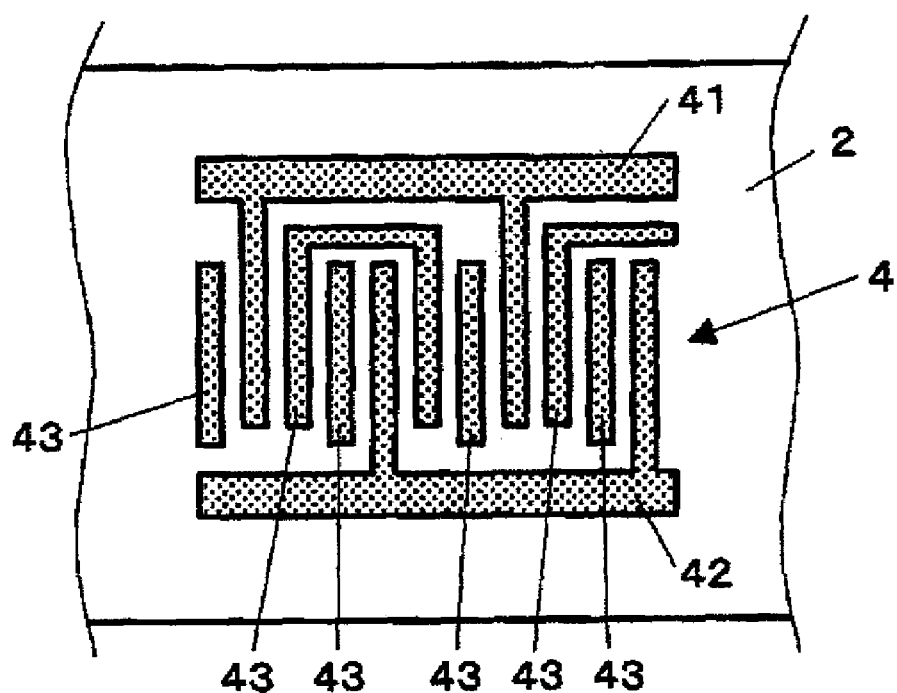
FIG. 11 is a partial top plan view showing another example of an interdigital electrode of the surface acoustic wave motor.

Further, the unidirectional interdigital electrode 4 shown in FIG. 11 is formed by placing reflection electrodes 43 having floating potentials between element electrodes of a pair of interdigital electrodes 42 and 43 (sic, correctly: 41 and 42) which are opposite in polarity to each other. Here, the reflection electrodes 43 are composed of groups of square-cornered U-shaped or I-shaped electrodes.

Figure 12A:
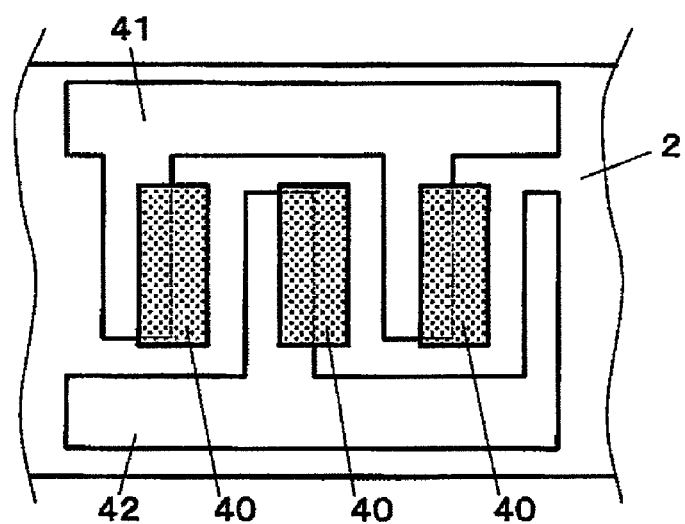
Figure 12B:
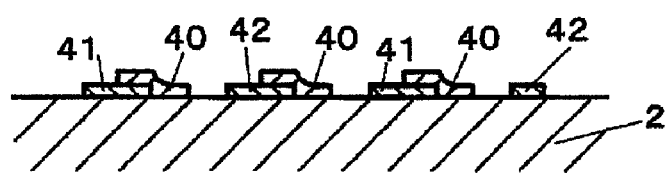
FIG. 12B is a partial cross-sectional view of the interdigital electrode.

Further, the unidirectional interdigital electrode 4 shown in FIGS. 12A and 12B is formed such that a pair of interdigital electrodes 41 and 42, which are opposite in polarity to each other and formed e.g. of an aluminum thin film pattern, are placed at a predetermined distance from each other, and that a reflecting portion 40 formed of a silicon oxide $SiO_2$ film is formed on a surface area which straddles a surface portion of each element electrode portion of these electrodes and a surface portion of a surface acoustic wave substrate 2.

These series of unidirectional interdigital electrodes 4 shown in FIGS. 10, 11, 12A and 12B are all different in structure, but their operations are similar to the interdigital electrodes 4 (FIG. 8) described in the sixth embodiment, and the description is omitted.

Seventh Embodiment

Figure 13:
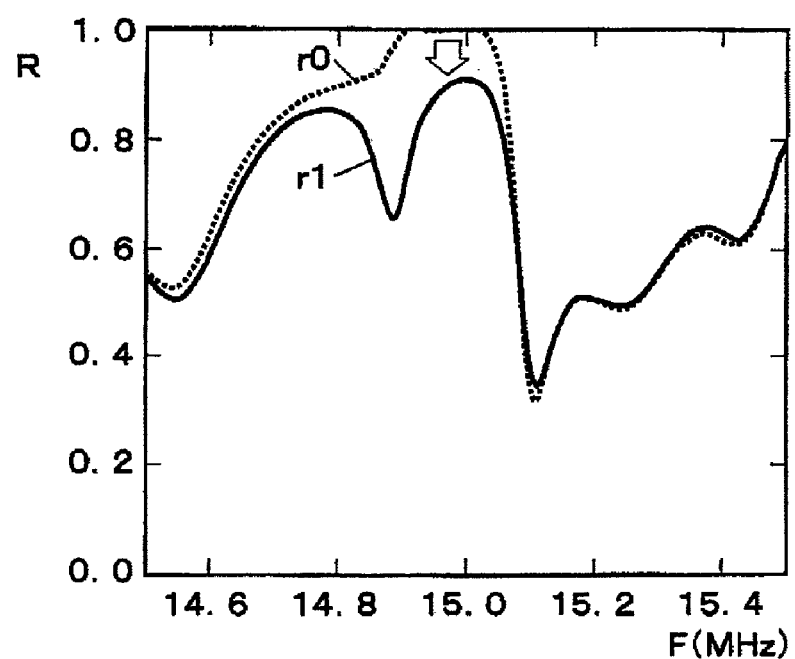
FIG. 13 is a graph of frequency characteristics for explaining an adjustment of the reflectivity of a recovery interdigital electrode of a surface acoustic wave motor according to a seventh embodiment of the present invention.
Figure 14A:
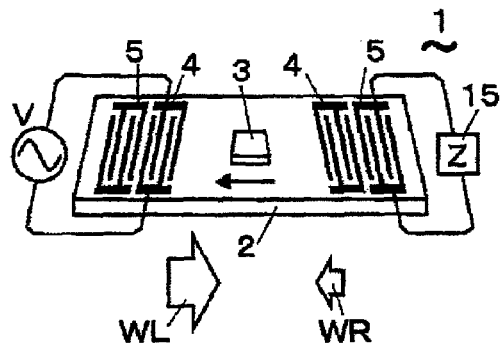
FIGS. 14A and 14B are schematic explanatory views showing about movements of a slider made by using impedance to adjust the reflectivities of the recovery interdigital electrodes of the surface acoustic wave motor.
Figure 14B:
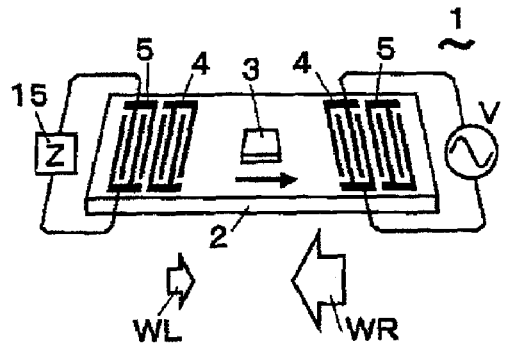

FIG. 13 shows a reflectivity R of recovery interdigital electrodes 5 of a surface acoustic wave motor 1 of a seventh embodiment, and FIGS. 14A and 14B show movements of a slider 3 made by adjusting the reflectivities of the recovery interdigital electrodes 5, while FIGS. 15A to 15D and FIG. 16 show examples of recovery interdigital electrodes 5 of various structures and impedance adjustments.

The surface acoustic wave motor 1 of the present embodiment uses the reflection of a surface acoustic wave by a recovery interdigital electrode 5 to recover energy of a surface acoustic wave, which is unused to drive the slider 3, so as to drive the slider 3 with lower power consumption (lower input) (FIG. 1).

Now, if the recovery interdigital electrode 5 totally reflects a surface acoustic wave, it causes a traveling wave component in the surface acoustic wave substrate 2 to be reduced, making it impossible to move the slider 3. Thus, for example, a resistor is connected to the recovery interdigital electrode 5 to change the impedance of the interdigital electrode 5 so as to reduce the reflectivity, thereby securing a traveling wave of the surface acoustic wave, whereby the traveling wave can move the slider 3. It is possible to use a passive element such as a resistor, an inductor or a capacitor or a combination of these as an electrical circuit 15 for adjusting the impedance of the recovery interdigital electrode 5. In addition, as in a ladder-shaped electrode, the impedance value may be made zero by short-circuiting the opposite polarities of the recovery interdigital electrode 5.

FIG. 13 shows an example of adjustment of the reflectivity. The horizontal axis is the frequency of a voltage applied to the driving interdigital electrode 4, while the vertical axis is the reflectivity R of the recovery interdigital electrode 5. Curve r0 shows the reflectivity of the recovery interdigital electrode 5 for a surface acoustic wave generated at 15 MHz which is a resonant frequency of the driving interdigital electrode 4. In the case of this curve r0, the impedance adjustment of the recovery interdigital electrode 5 is not made. Further, the pair number of comb teeth (electrode fingers) of the recovery interdigital electrode 5 and the distance d between the equivalent reflecting surfaces are set to obtain total reflection at a frequency of 15 MHz. Curve r1 shows an example in which a resistor, as an electrical circuit 15, is connected to the recovery interdigital electrode 5 so as to reduce the reflectivity R. In curve r1, the reflectivity R can be reduced to R=0.9 at a frequency of 15 MHz.

FIG. 14A shows a state of a surface acoustic wave motor 1 comprising driving interdigital electrodes 4 provided to sandwich a slider 3 as well as recovery interdigital electrodes provided outside the interdigital electrodes 4, in which a resistor (electrical circuit 15) for reflectivity adjustment is connected to the recovery interdigital electrode 5 on the right while an external power supply V is connected to the driving interdigital electrode 4 on the left, so as to move the slide 3 leftward. In this state, the effect of the resistor R allows a surface acoustic wave WL traveling rightward to be sufficiently larger in magnitude than a surface acoustic wave WR traveling leftward, so that it is possible to apply, to the slider 3, a surface acoustic wave having a traveling wave component PH and a standing wave component PV with sufficient amplitude. In other words, a sufficient traveling wave component PH to move the slider 3 can be obtained in the surface acoustic wave motor 1 of the type to recover energy by the multi-reflection of surface acoustic wave. FIG. 14B shows a state, in which the connections of the electrical circuit 15 and the external power supply V are exchanged so as to move the slider 3 rightward.

Figure 15A:
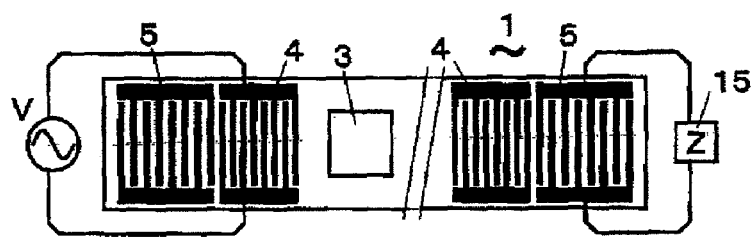
FIGS. 15A to 15D are respectively examples of using different recovery interdigital electrodes in the surface acoustic wave motor, and are schematic explanatory views showing about movements of a slider made by adjusting impedance to adjust the reflectivity or phase of the respective recovery interdigital electrodes of the surface acoustic wave motor.
Figure 15B:
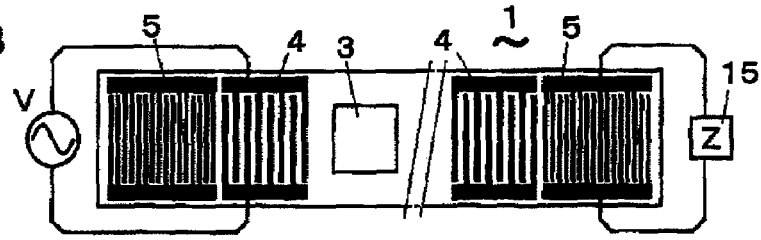
Figure 15C:
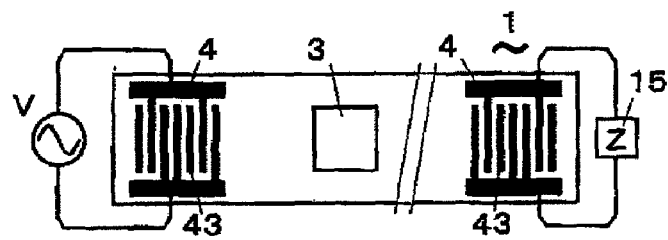
Figure 15D:
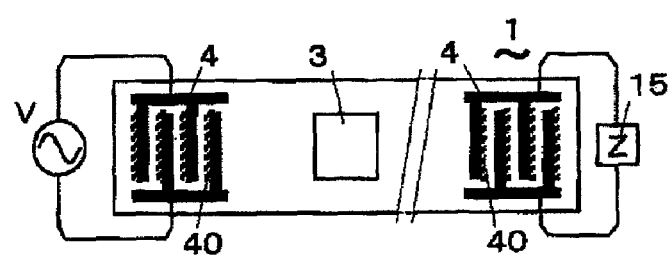
Figure 16:
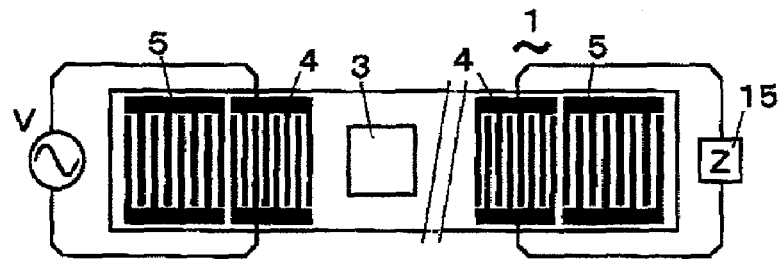
FIG. 16 is a schematic explanatory view showing another example of a method of connecting an electrical circuit for impedance adjustment to an interdigital electrode of the surface acoustic wave motor.

The recovery interdigital electrode 5 in the surface acoustic wave motor 1 shown in FIGS. 14A and 14B, FIGS. 15A and 15B and FIG. 16 serves as a reflection electrode to form the adjacent driving interdigital electrode 4 into a unidirectional interdigital electrode. The reflection electrode of FIG. 15B is an example of the structure shown in FIG. 10. The respective ones of the driving interdigital electrodes 4 in the surface acoustic wave motor shown in FIGS. 15C and 15D have built therein a structure to form a unidirectional interdigital electrode. The former is an example of the structure shown in FIG. 11, while the latter is an example of the structure shown in FIGS. 12A and 12B.

Any of the above-mentioned recovery interdigital electrodes 5 (or driving interdigital electrode 4 in the case of FIG. 16) of the present embodiment has connected thereto an electrical circuit 15 formed of a passive element, such as e.g. a resistor, an inductor or the like, to adjust the impedance. If this electrical circuit 15 is a resistor, it has a function to adjust the reflectivity of the recovery interdigital electrode, while if it is an inductor or a capacitor, it has a function to adjust the phase of a surface acoustic wave reflected by the recovery interdigital electrode 5. In the latter case, the distance d between the equivalent reflecting surfaces can be adjusted.

Note that the driving interdigital electrodes 4 in e.g. FIG. 15A of the present embodiment can be regarded as the interdigital electrodes 4a of FIG. 8A in the fifth embodiment, while the recovery interdigital electrodes 5 can be regarded as the reflection electrodes 4b of FIG. 8A in the same fifth embodiment.

Eight Embodiment

Figure 17A:
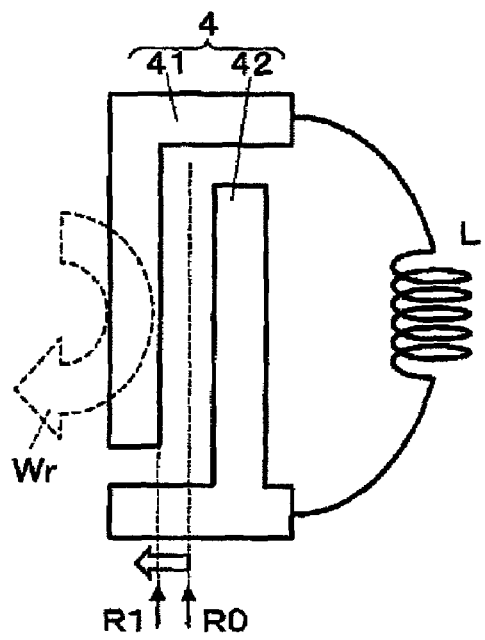
FIGS. 17A and 17B are schematic explanatory views showing examples of phase adjustment of a reflected surface acoustic wave in a surface acoustic wave motor according to an eighth embodiment of the present invention.
Figure 17B:
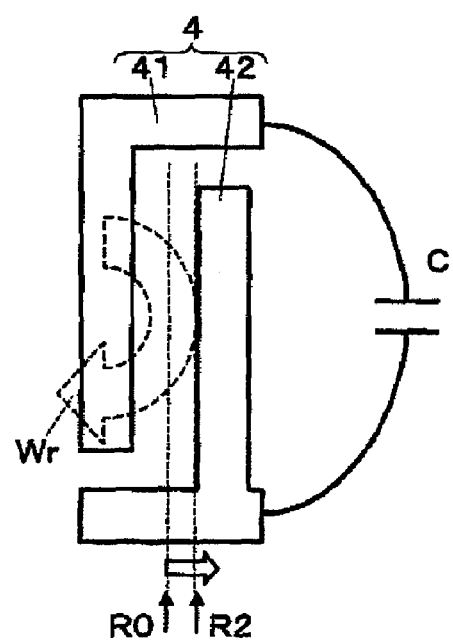

FIGS. 17A and 17B each show a state in which an inductor L or a capacitor C is connected to an interdigital electrode 4 formed of a pair of interdigital electrodes 41 and 42 which are opposite in polarity to each other, so as to change the phase of a surface acoustic wave reflected by the interdigital electrode 4. In this case, the phase change is generated by a change in the position of the reflecting surface. The capability of changing the position of the reflecting surface means that the distance d between the equivalent reflecting surfaces described in the third embodiment (FIG. 5A) can be adjusted after the pattern formation of the interdigital electrode.

When an inductor L is connected between the interdigital electrodes 41 and 42 as shown in FIG. 17A, the phase of a surface acoustic wave after reflection is delayed relative to the phase of the surface acoustic wave before the reflection. Accordingly, the apparent reflection position of a surface acoustic wave Wr, which is incident from left and reflected, can be regarded as having been moved to a leftward position R1 from a position R0. Here, assuming that the phase delay due to the inductance value of the inductor L is θ, it is possible to achieve reflections which satisfy the periodic boundary conditions for multi-reflected surface acoustic waves W1, W2, W3, W4, and so on, when the distance d between the equivalent reflecting surfaces and θ satisfy $2d-\theta\lambda/2\pi=n\lambda$. Note that the distance between the positions R0 and R1 is $\theta\lambda/4\pi$.

On the other hand, when a capacitor C is connected between the interdigital electrodes 41 and 42 as shown in FIG. 17B, the phase of a surface acoustic wave after reflection is advanced relative to the phase of the surface acoustic wave before the reflection. Accordingly, the apparent reflection position of a surface acoustic wave Wr, which is incident from left and reflected, can be regarded as having been moved to a rightward position R2 from a position R0. Here, assuming that the phase delay due to the capacitance value of the capacitor is φ, it is possible to achieve reflections which satisfy the periodic boundary conditions for multi-reflected surface acoustic waves W1, W2, W3, W4, and so on, when the distance d between the equivalent reflecting surfaces and φ satisfy $2d+\varphi\lambda/2\pi=n\lambda$. Note that the distance between the positions R0 and R2 is $\varphi\lambda/4\pi$.

Ninth Embodiment

Figure 18A:
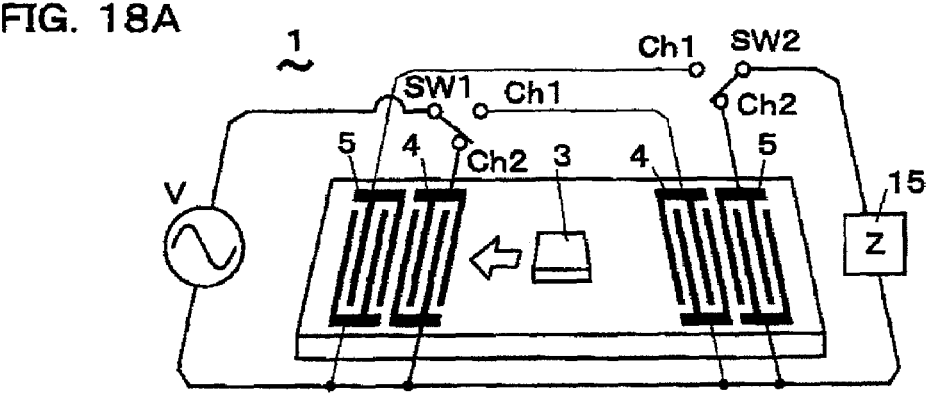
FIGS. 18A and 18B are schematic explanatory views showing a state in which the moving direction of a slider in a surface acoustic wave motor according to a ninth embodiment of the present invention is switched by switches.
Figure 18B:
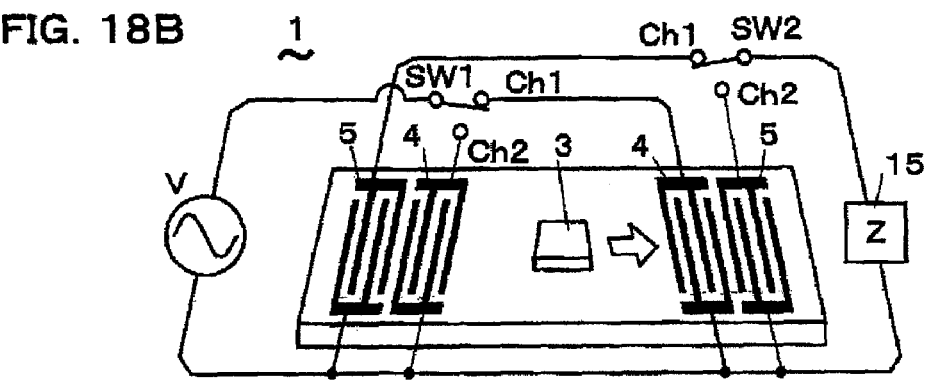

FIGS. 18A and 18B show a state in which the moving direction of a slider 3 in a surface acoustic wave motor 1 of a ninth embodiment is switched by switches SW1 and SW2. Similarly as in the surface acoustic wave motor 1 shown in FIG. 15A of the fifth embodiment, the surface acoustic wave motor 1 of the present embodiment recovers energy by the multi-reflection. Only the distinctive points of the present embodiment will be described.

The surface acoustic wave motor 1 has driving interdigital electrodes 4 provided on the surface S of a surface acoustic wave substrate 2 forward and backward in the direction of travel of a driving surface acoustic wave, and comprises a switch SW1 for selectively connecting an external power supply V to either of these driving interdigital electrodes 4 as well as a switch SW2 for selectively connecting an electrical circuit 15 to either of a pair of recovery interdigital electrodes 5. The direction of travel of the driving surface acoustic wave can be switched by these switches SW1 and SW2 so as to switch the moving direction of the slider 3. Furthermore, the number of external power supplies V for generating a driving surface acoustic wave can be reduced to one.

Tenth Embodiment

Figure 19A:
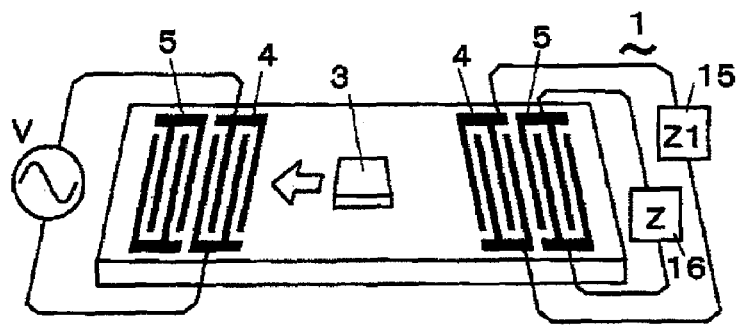
FIGS. 19A and 19B are schematic explanatory views for explaining the operation of a surface acoustic wave motor according to a tenth embodiment of the present invention.
Figure 19B:
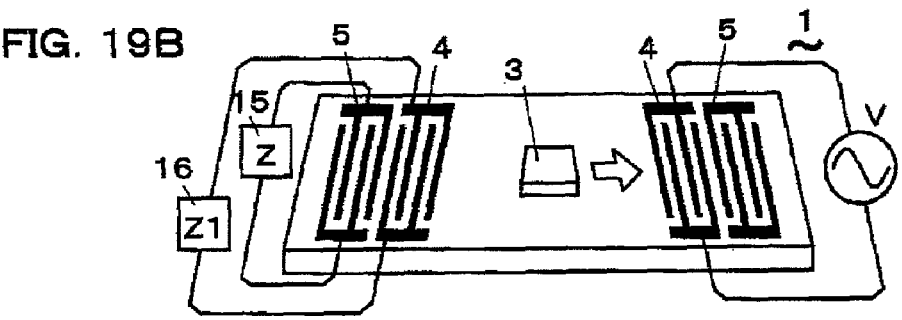
Figure 20:
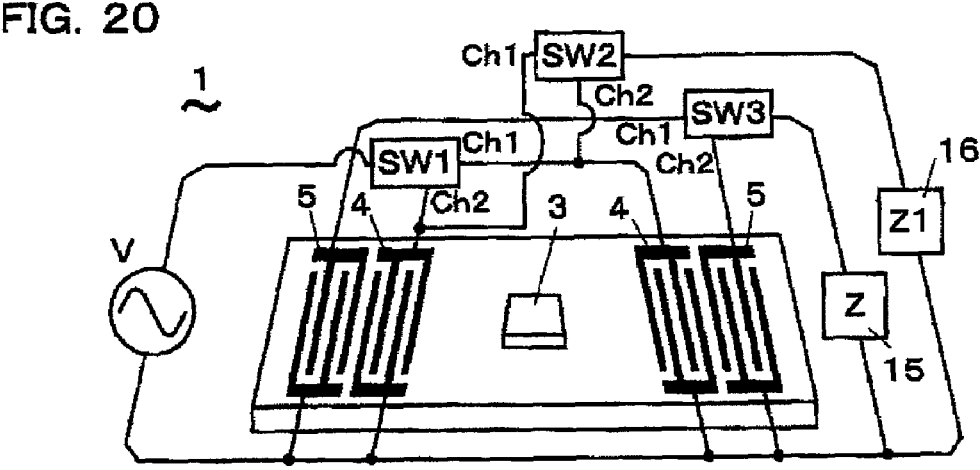
FIG. 20 is a schematic explanatory view showing a state in which the moving direction of a slider in the surface acoustic wave motor is switched by switches.

FIGS. 19A and 19B and FIG. 20 show a surface acoustic wave motor 1 of a tenth embodiment. The surface acoustic wave motor 1 of the present embodiment is such that multiple recovery interdigital electrodes 5 are used in the above-mentioned ninth embodiment. In order to enable multiple recovery interdigital electrodes 5, a driving interdigital electrode 4 which is not connected to an external power supply is used in common as a recovery interdigital electrode. In addition, electrical circuits 15 and 16 for impedance adjustment are connected to the multiple recovery interdigital electrodes 5, respectively. In the case of FIG. 20, three switches SW1, SW2 and SW3 are provided to make it possible to switch the moving direction of a slider 3 by switching between them. Note that a Photo-MOS relay having a high response speed is suitable for the switch.

Eleventh Embodiment

Figure 21A:
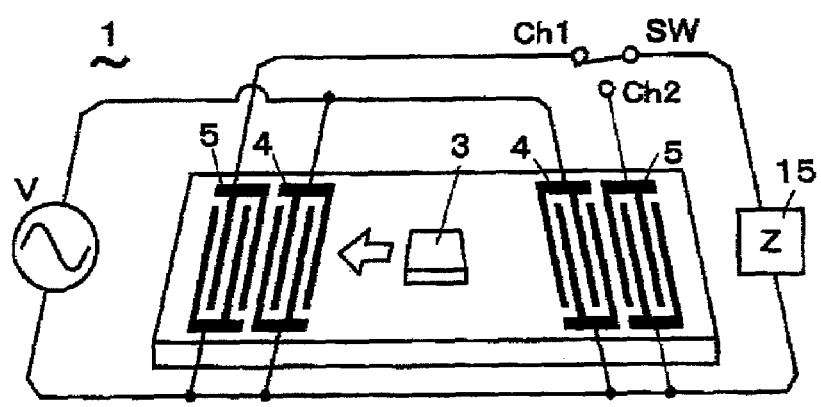
FIGS. 21A and 21B are schematic explanatory views for explaining the operation of a surface acoustic wave motor according to an eleventh embodiment of the present invention.
Figure 21B:
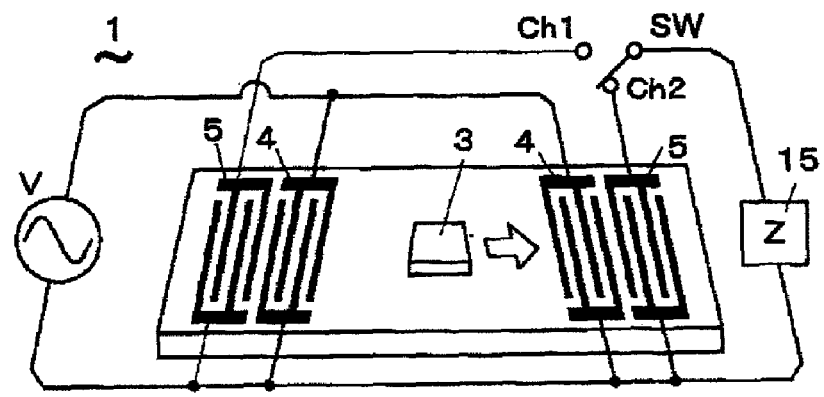

FIGS. 21A and 21B show a surface acoustic wave motor 1 of an eleventh embodiment. The surface acoustic wave motor 1 of the present embodiment is such that the switches SW1 and SW2 in the above-mentioned ninth embodiment are reduced to one. More specifically, in the surface acoustic wave motor 1, driving interdigital electrodes 4 are placed between a pair of recovery interdigital electrodes 5, and are all connected to an external power supply V without via a switch. Further, the direction of travel of a driving surface acoustic wave can be switched by using a switch SW to selectively connect an electrical circuit 15 to either of the pair of recovery interdigital electrodes 5. This surface acoustic wave motor 1 does not switch the external power supply V, so that the moving direction of a slider 3 can be switched by using the single switch SW for reciprocal movement.

Twelfth Embodiment

Figure 22:
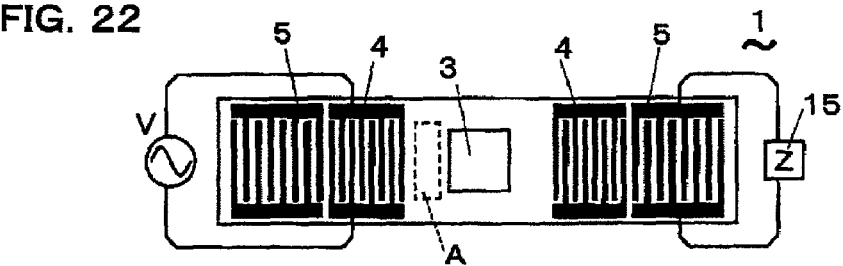
FIG. 22 is a schematic top plan view for explaining the operation of a surface acoustic wave motor according to a twelfth embodiment of the present invention.

FIG. 22 shows a surface acoustic wave motor 1 of a twelfth embodiment. The surface acoustic wave motor 1 of the present embodiment is such that the electrical circuit 15 in e.g. the surface acoustic wave motor 1 having the structure of FIG. 15A of the above-mentioned FIG. 17 is made variable in impedance, so as to make it possible to control the moving speed and moving direction of a slider 3 in real time. For such real time control, in e.g. an area A to generate a surface acoustic wave, the amplitude of the surface acoustic wave and a phase shift relative to the phase of a voltage output by an external power supply V are measured. Based on the measured information, the impedance of an electrical circuit 15 is adjusted to control the movement of the slider 3. The variable impedance Z of the electrical circuit 15 is expressed by $Z=R+iX$. Here, R is a resistance value based on a variable resistor, while X is a reactance value based on a variable capacitor or a variable inductor. A thirteenth embodiment and a fourteenth embodiment will show an example of control performed by adjusting the resistance R, and an example of control performed by adjusting the reactance X, respectively.

When driving the surface acoustic wave motor 1, variations in conditions are caused, for example, by: variations in the wave amplitude due to e.g. variations in the voltage of the external power supply V; variations in the wavelength and occurrence of a phase difference due to variations in the quality of the surface acoustic wave substrate 2 and due to manufacturing variations in the size of the interdigital electrode; and variations in the phase due to e.g. variations in the applied pressure N of the slider 3. Thus, the impedance of the electrical circuit 15 is adjusted for the variations in conditions so as to adjust e.g. the phase of a reflected wave and the reflectivity of a recovery interdigital electrode 5, making it possible to control the operation of the slider 3 in real time.

Thirteenth Embodiment

Figure 23:
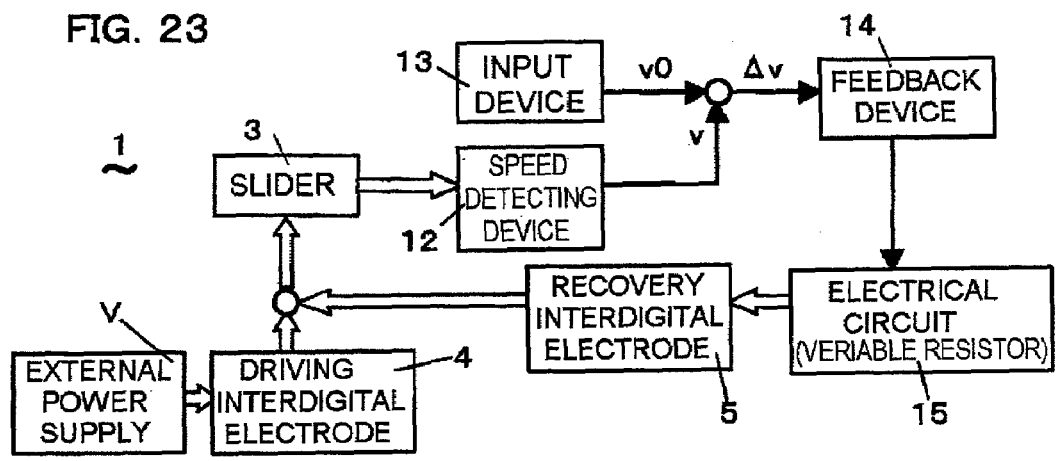
FIG. 23 is a control block diagram of a surface acoustic wave motor according to a thirteenth embodiment of the present invention.

FIG. 23 shows a control block diagram of a surface acoustic wave motor 1 of a thirteenth embodiment. The surface acoustic wave motor 1 of the present embodiment more specifically shows the real time control of the slider 3 in the above-mentioned twelfth embodiment. The surface acoustic wave motor 1 comprises: a speed detecting device 12 for detecting a relative speed v of a slider 3 relative to a surface acoustic wave substrate 2; a speed input device 13 for inputting a target moving speed v0 of the slider 3; and a feedback device 14 for feedback control which changes the impedance of an electrical circuit 15 formed of a passive element so as to allow the relative speed v detected by the speed detecting device 12 to be equal to the target moving speed v0 input by the speed input device 13.

The impedance changed in this embodiment is a resistance R. As shown in FIGS. 14A and 14B of the above-mentioned seventh embodiment, the reflectivity of a recovery interdigital electrode 5 can be adjusted by a resistor so as to control the magnitude of a traveling wave component PH for moving the slider 3. Further, generally, the speed control of the slider 3 can be performed by changing the amplitude or the pulse width of a voltage output from an external power supply V. However, in the surface acoustic wave motor 1 of the present embodiment to perform energy recovery of the multi-reflection type, the speed control of the slider 3 can be easily performed in real time by changing the resistance component of the electrical circuit 15 without adjusting the external power supply V.

The surface acoustic wave motor 1 with the electrical circuit 15 whose impedance, particularly resistance, is variable as mentioned above is adjusted by adjusting the impedance so as to make it possible to obtain targeted driving force, speed and distribution of surface acoustic wave oscillation at the time of initial operation after assembly. Further, the capability of real time control as mentioned above makes it possible to cope with the degradation in characteristics such as reductions in speed and driving force, which occurs while the surface acoustic wave motor 1 is operated for a long time. It is possible to correct a reduction in speed by measuring the moving speed v of the slider 3 in real time, and by detecting the degradation in driving characteristics based on the reduction, and further by adjusting the impedance Z, particularly resistance R. The degradation in driving characteristics may be due to, but not limited to, the abrasion of a contact portion of the slider 3 with the surface acoustic wave substrate 2.

Fourteenth Embodiment

Figure 24:
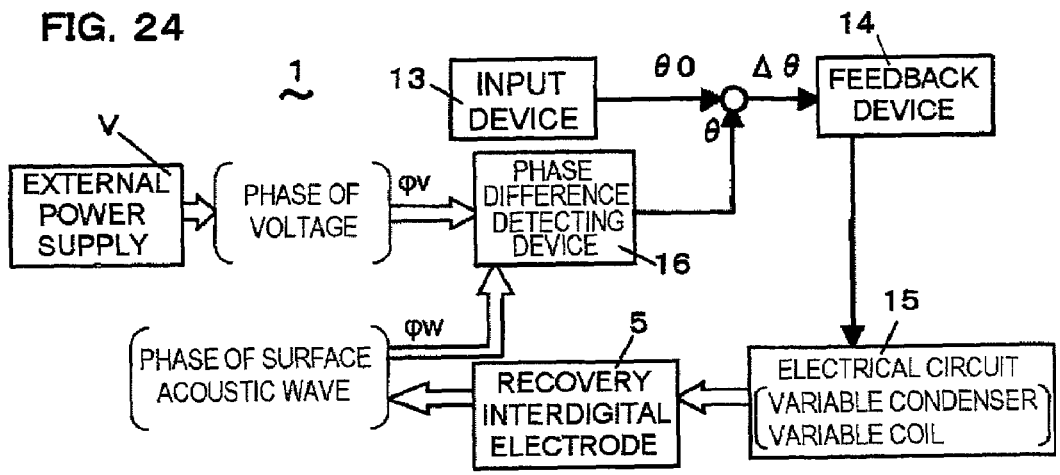
FIG. 24 is a control block diagram of a surface acoustic wave motor according to a fourteenth embodiment of the present invention.

FIG. 24 shows a control block diagram of a surface acoustic wave motor 1 of a fourteenth embodiment. Similarly as in the above-mentioned thirteenth embodiment, the surface acoustic wave motor 1 of the present embodiment more specifically shows the real time control of the slider 3 in the above-mentioned twelfth embodiment. The surface acoustic wave motor 1 described comprises: a phase difference detecting device 16 for detecting a phase difference $\theta$ between a phase $\phi v$ of a voltage waveform from an external power supply V for generation of a surface acoustic wave and a phase $\phi w$ of a driving surface acoustic wave actually generated; a phase difference input device 13 for inputting a target phase difference $\theta 0$; and a feedback device 14 for feedback control which changes the impedance of an electrical circuit 15 so as to allow the phase difference $\theta$ detected by the phase difference detecting device 16 to be equal to the target phase difference $\theta 0$ input by the phase difference input device 13.

The impedance changed in this embodiment is a resistance X. As shown in FIGS. 17A and 17B of the above-mentioned eighth embodiment, the phase of a surface acoustic wave reflected by a recovery interdigital electrode 5 can be adjusted by adjusting the boundary conditions using an inductor L or a capacitor C, so as to control the magnitude of a traveling wave component PH for moving the slider 3. Similarly as in the above-mentioned thirteenth embodiment, the surface acoustic wave motor 1 with the electrical circuit 15 whose impedance, particularly reactance, is variable can be adjusted by adjusting the reactance so as to make it possible to obtain targeted driving force, speed and distribution of surface acoustic wave oscillation at the time of initial operation after assembly. Further, the capability of real time control as mentioned above makes it possible to correct a phase shift of a surface acoustic wave, so as to correct a reduction in speed of the slider 3, by measuring, in real time, the phase shift which occurs while the surface acoustic wave motor 1 is operated for a long time, and by detecting the degradation in driving characteristics based on the phase shift, and further by adjusting the impedance Z, particularly reactance X.

The phase shift is mainly due to, but not limited to, the variation in applied pressure N provided to the slider 3. The variation in the applied pressure N may be due to the degradation in the pressure applying means, such as degradation in a spring for generating the applied pressure N and degradation in a magnet. It is to be noted that the present invention is not limited to the structures described above, and various modifications are possible. For example, it is possible to combine the individual contents of the respective embodiments mentioned above with each other so as to form a surface acoustic wave motor 1.

This application claims priority based on the Japanese patent application filed Mar. 28, 2005 and the Japanese patent application filed Jul. 19, 2005. The entirety of the contents of the applications are hereby incorporated by reference into this application.

The invention claimed is:

1. A surface acoustic wave motor comprising:
   a surface acoustic wave substrate;
   a slider placed to contact a surface of the surface acoustic wave substrate while being provided with an applied pressure;
   a driving interdigital electrode(s) provided on the surface of the surface acoustic wave substrate and connected to an external power supply for generating a driving surface acoustic wave in the surface acoustic wave substrate so as to drive the slider by a frictional force which is generated on a contact surface of the slider with the surface acoustic wave substrate based on the surface acoustic wave and the applied pressure to the slider; and
   recovery interdigital electrodes placed on the surface of the surface acoustic wave substrate forward and backward in the direction of travel of the surface acoustic wave for recovering energy of a surface acoustic wave, unused to drive the slider, in the surface acoustic wave, and for using the recovered energy to generate a surface acoustic wave,
   wherein the surface acoustic wave motor further comprises phase adjusting means for matching the phase of the surface acoustic wave generated by the recovery interdigital electrode to the phase of the driving surface acoustic wave generated by the driving interdigital electrode.

2. The surface acoustic wave motor according to claim 1, having at least a pair of the recovery interdigital electrodes, one of which is used to convert mechanical energy of the surface acoustic wave to, and recover, electrical energy, and the other of which is used to convert the recovered electrical energy to mechanical energy for generating a driving surface acoustic wave.

3. The surface acoustic wave motor according to claim 2, wherein the phase adjusting means is formed of an electrical circuit connected between the one and the other of the recovery interdigital electrodes.

4. The surface acoustic wave motor according to claim 2, wherein the phase adjusting means is set based on a length of a region of the surface acoustic wave substrate between ones of the respective recovery and driving interdigital electrodes in which region the slider moves, wherein the length is set at a sum length of a length to generate a resonant-state surface acoustic wave without placing the slider in the region plus a length corresponding to an amount of phase change caused in the resonant-state surface acoustic wave by placement of the slider in the region.

5. The surface acoustic wave motor according to claim 1, having at least a pair of the recovery interdigital electrodes, one of which is used to reflect and bring the surface acoustic wave back to the driving interdigital electrode so as to recover the energy of the surface acoustic wave, and the other of which is used to reflect the brought back surface acoustic wave again so as to generate a driving surface acoustic wave.

6. The surface acoustic wave motor according to claim 5, wherein the recovery interdigital electrode used as an interdigital electrode for driving serves in common as the driving interdigital electrode.

7. The surface acoustic wave motor according to claim 5, wherein the phase adjusting means is set based on a length between equivalent reflecting surfaces of the pair of recovery interdigital electrodes, in which the length is essentially equal to an integer multiple of a half wavelength of the surface acoustic wave generated by the recovery interdigital electrode.

8. The surface acoustic wave motor according to claim 5, wherein the phase adjusting means is formed of an electrical circuit connected to the recovery interdigital electrode placed forward in the direction of travel of the driving surface acoustic wave, in which an impedance of the electrical circuit is set so as to adjust the phase of a reflected wave reflected by that interdigital electrode.

9. The surface acoustic wave motor according to claim 7, wherein the reflectivity of the reflected wave reflected by the recovery interdigital electrode is adjusted by at least one of: an adjustment of distance between element electrodes of that interdigital electrode; an adjustment of number of element electrodes of that interdigital electrode; and an adjustment of magnitude of the applied pressure provided to the slider.

10. The surface acoustic wave motor according to claim 7, wherein the recovery interdigital electrode has connected thereto an electrical circuit to set impedance so as to adjust the reflectivity of a reflected wave reflected by that interdigital electrode.

11. The surface acoustic wave motor according to claim 10, wherein the driving interdigital electrodes are provided on the surface of the surface acoustic wave substrate forward and backward in the direction of travel of the driving surface acoustic wave, in which the surface acoustic wave motor comprises a switch for selectively connecting the external power supply to either of these driving interdigital electrodes, and a switch for connecting the electrical circuit to either of the pair of recovery interdigital electrodes, such that the direction of travel of the driving surface acoustic wave is switched by these switches.

12. The surface acoustic wave motor according to claim 11, wherein the driving interdigital electrodes are placed between the pair of recovery interdigital electrodes, and are all connected to the external power supply without via the switches, such that the electrical circuit is selectively connected to either of the pair of recovery interdigital electrodes by using the switches so as to switch the direction of travel of the driving surface acoustic wave.

13. The surface acoustic wave motor according to claim 10, wherein the electrical circuit is variable in impedance.

14. The surface acoustic wave motor according to claim 13, which further comprises:
a speed detecting device for detecting a relative speed of the slider relative to the surface acoustic wave substrate;
a speed input device for inputting a target moving speed of the slider; and
a feedback device for feedback control which changes the impedance of the electrical circuit so as to allow the relative speed detected by the speed detecting device to be equal to the target moving speed input by the speed input device.

15. The surface acoustic wave motor according to claim 13, which further comprises:
a phase difference detecting device for detecting a phase difference between a phase of a voltage waveform from the external power supply for generation of a surface acoustic wave and a phase of a driving surface acoustic wave actually generated;
a phase difference input device for inputting a target phase difference; and
a feedback device for feedback control which changes the impedance of the electrical circuit so as to allow the phase difference detected by the phase difference detecting device to be equal to the target phase difference input by the phase difference input device.

16. The surface acoustic wave motor according to claim 1, wherein the driving interdigital electrodes are provided on the surface of the surface acoustic wave substrate forward and backward in the direction of travel of the surface acoustic wave, and
wherein at least one of the driving interdigital electrodes is provided with unidirectionalizing means for allowing amplitude of a surface acoustic wave emitted from one side to be larger than amplitude of a surface acoustic wave emitted from the other side without allowing the surface acoustic waves generated by that driving interdigital electrode to be emitted equally from both sides of the interdigital electrode.

17. The surface acoustic wave motor according to claim 1, wherein a width of a portion of the slider to contact the surface of the surface acoustic wave substrate, which width is perpendicular to the direction of travel of the surface acoustic wave, is effectively the same as an overlap width of element electrodes of the driving interdigital electrode(s).

18. The surface acoustic wave motor according to claim 17, wherein the slider has, on the portion thereof to contact the surface of the surface acoustic wave substrate, contact projections which are uniformly distributed in a direction perpendicular to the direction of travel of the surface acoustic wave.

* * * * *